(12) United States Patent
Jang

(10) Patent No.: US 11,592,696 B2
(45) Date of Patent: Feb. 28, 2023

(54) DISPLAY DEVICE AND METHOD OF MANUFACTURING THE SAME

(71) Applicant: SAMSUNG DISPLAY CO., LTD., Yongin-si (KR)

(72) Inventor: Min Sok Jang, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/453,235

(22) Filed: Nov. 2, 2021

(65) Prior Publication Data

US 2022/0057670 A1  Feb. 24, 2022

Related U.S. Application Data

(62) Division of application No. 16/287,684, filed on Feb. 27, 2019, now Pat. No. 11,194,183.

(30) Foreign Application Priority Data

May 25, 2018 (KR) .......................... 10-2018-0059516

(51) Int. Cl.
G02F 1/1333 (2006.01)
G02F 1/1362 (2006.01)

(52) U.S. Cl.
CPC ...... *G02F 1/133308* (2013.01); *G02F 1/1362* (2013.01); *G02F 1/13338* (2013.01); *G02F 1/133305* (2013.01); *G02F 1/133371* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 9,599,451 B2 | 3/2017 | Ullmann et al. |
| 2016/0209874 A1 | 7/2016 | Choi et al. |
| 2016/0338219 A1 | 11/2016 | Seo et al. |
| 2017/0308843 A1 | 10/2017 | Kim |
| 2019/0361286 A1 | 11/2019 | Jang |

*Primary Examiner* — Richard H Kim
(74) *Attorney, Agent, or Firm* — F. Chau & Associates, LLC

(57) ABSTRACT

A display device and a method of manufacturing the display device are provided. The display device includes a first lamination member that includes a first area and a second area that is an area other than the first area; a bonding member disposed on one side of the first lamination member and that includes an adhesive resin; and a second lamination member disposed on the other side of the bonding member, wherein the bonding member includes a crack portion formed in at least a part of a matrix of the adhesive resin.

2 Claims, 23 Drawing Sheets

DISPLAY DEVICE AND METHOD OF MANUFACTURING THE SAME

This application is a divisional of U.S. application Ser. No. 16/287,684, filed on Feb. 27, 2019 in the U.S. Patent and Trademark Office, which claims priority under 35 U.S.C. § 119 from Korean Patent Application No. 10-2018-0059516, and all the benefits accruing therefrom, filed on May 25, 2018 in the Korean Intellectual Property Office, the contents of both of which are herein incorporated by reference in their entireties.

BACKGROUND

1. Technical Field

Embodiments of the present disclosure are directed to a display device and a method of manufacturing the same, and more particularly, to a display device that includes a bonding member whose stress decreases depending on deformation and a method of manufacturing the same.

2. Discussion of the Related Art

Display devices have become more widely used with the development of multimedia. Accordingly, various types of display devices, such as liquid crystal displays (LCDs) or organic light emitting displays (OLEDs), have been used.

A display device is a device that displays an image, and includes a display panel, such as an organic light emitting display panel or a liquid crystal display panel. A display panel includes a window that protects the display panel from external impacts. In particular, windows are widely used on portable electronic appliances, such as smart phones. Some portable appliances use a touch input function. A display device may include a touch panel for performing a touch input function. The window, touch panel, and display panel are attached to each other through an adhesive.

The components of a display device, such as a window, a touch panel and a display panel, may be foldable or flexible members that are easily deformed by an external force due to being flexible. In this case, an adhesive that attaches the flexible members to each other may be elastic so that it can return from a deformed state to an undeformed original state by action of a repulsive force due to the deformation. The adhesiveness at the interface with the members can decrease, thereby causing a lifting phenomenon or bubble generation in the display device.

SUMMARY

Embodiments of the present disclosure can provide a display device that includes a bonding member that has a crack portion to reduce the stress caused by deformation in the folding area of a window or a panel.

However, embodiments of the present disclosure are not restricted to those set forth herein. The above and other aspects of the present disclosure will become more apparent to one of ordinary skill in the art to which embodiments of the present disclosure pertain by referencing the detailed description of the present disclosure given below.

According to an exemplary embodiment of the present disclosure, a display device includes: a first lamination member that includes a first area and a second area that is an area other than the first area; a bonding member disposed on one side of the first lamination member and that includes an adhesive resin; and a second lamination member disposed on an other side of the bonding member, wherein the bonding member includes a crack portion formed in at least a part of a matrix of the adhesive resin.

In an exemplary embodiment, the adhesive resin includes: a first matrix region in the matrix; and a second matrix region that faces the first matrix region with respect to the crack portion, wherein no bonds of the adhesive resin are formed in at least a portion of the adhesive resin between the first matrix region and the second matrix region.

In an exemplary embodiment, at least a part of the crack portion overlaps the first area.

In an exemplary embodiment, the bonding member includes a non-crack portion that is a region other than the crack portion, wherein the non-crack portion overlaps the second area.

In an exemplary embodiment, the bonding member includes a first sub-bonding member and a second sub-bonding member spaced apart from each other in a direction perpendicular to a plane of the lamination members and that face each other with respect to an area that overlaps the first area.

In an exemplary embodiment, a first side portion of the first sub-bonding member and a second side portion of the second sub-bonding member that faces the first side portion are aligned with each other at an interface of the first area and the second area.

In an exemplary embodiment, the first side portion and the second side portion extend into an area that overlaps the first area, and at least a part of the crack portion in each of the first side portion and the second side portion is formed in the area that overlaps the first area.

In an exemplary embodiment, at least some of the first side portion and the second side portion further extend into an area that overlaps the first area.

In an exemplary embodiment, one end portion of each of the first side portion and the second side portion contacts the first lamination member further into the area that overlaps the first area as compared to a position where the other end portion contacts the second lamination member.

In an exemplary embodiment, the first side portion and the second side portion are inclined at an inclination angle with respect to the first lamination member and the second lamination member, and the inclination angle of each of the first side portion and the second side portion with respect to the first lamination member and the second lamination member ranges from 45° to 80°.

In an exemplary embodiment, the bonding member includes a third sub-bonding member disposed on the one side of the first lamination member and a fourth sub-bonding member disposed on the other side of the third sub-bonding member.

In an exemplary embodiment, the third sub-bonding member and the fourth sub-bonding member are not disposed in the area that overlaps the first area, wherein an empty space is formed.

In an exemplary embodiment, at least one of a third side portion where the third sub-bonding member is in contact with the empty space, and a fourth side portion where the fourth sub-bonding member is in contact with the empty space, overlaps the first area.

In an exemplary embodiment, the third side portion extends further into an area where the empty space is formed, as compared with the fourth side portion.

According to another exemplary embodiment of the present disclosure, a display device includes a touch member that includes a folding area around a folding line and a non-folding area that is an area other than the folding area;

a first optical clear bonding member disposed on one side of the touch member and that includes an adhesive resin; a window member disposed on the first optical clear bonding member; a second optical clear bonding member disposed on an other side of the touch member and that includes the adhesive resin; and a display member disposed on the second optical clear bonding member, wherein at least one of the first optical clear bonding member and the second optical clear bonding member includes a crack portion formed in at least a part of a matrix of the adhesive resin, and at least a part of the crack portion is formed in an area that overlaps the folding area.

In an exemplary embodiment, at least one of the first optical clear bonding member and the second optical clear bonding member includes: a first crack portion that is an area where the crack portion is formed; and a second crack portion that has a higher density than the first crack portion, wherein at least a part of the second crack portion is formed in the area that overlaps the folding area.

In an exemplary embodiment, at least one of the first optical clear bonding member and the second optical clear bonding member further includes a non-crack portion that is a region where the crack portion is not formed, wherein the non-crack portion is formed in the area that overlaps the folding area.

According to an exemplary embodiment of the present disclosure, a method of manufacturing a display device includes: preparing an optical clear bonding portion that has voids formed therein; disposing the optical clear bonding portion between a first member and a second member to form a laminate; and pressing the laminate.

In an exemplary embodiment, preparing the optical clear bonding portion includes: dispersing acid-soluble particles in an adhesive resin to form a resin mixture; dissolving the acid-soluble particles by an acid-treatment, wherein voids are formed in the resin mixture; and heat-treating the resin mixture having the voids.

In an exemplary embodiment, pressing the laminate decreases a thickness of the optical clear bonding portion, where the decrease in the thickness of the optical clear bonding portion is inversely proportional to a fraction of the voids formed in the optical clear bonding portion.

DETAILED DESCRIPTION OF EXEMPLARY EMBODIMENTS

Embodiments of the present disclosure will now be described more fully hereinafter with reference to the accompanying drawings, in which exemplary embodiments of the disclosure are shown. Embodiments of the disclosure may, however, take different forms and should not be construed as limited to the exemplary embodiments set forth herein.

It will also be understood that when a layer is referred to as being "on" another layer or substrate, it can be directly on the other layer or substrate, or intervening layers may also be present. The same reference numbers may indicate the same components throughout the specification.

Hereinafter, embodiments of the present disclosure will be described with reference to the attached drawings.

A display device according to an embodiment includes a plurality of lamination members and a bonding member that attaches the lamination members. The plurality of lamination members include members and/or a window. The members may include a display member, a touch member, etc. The bonding member is optically clear.

Figure 1:
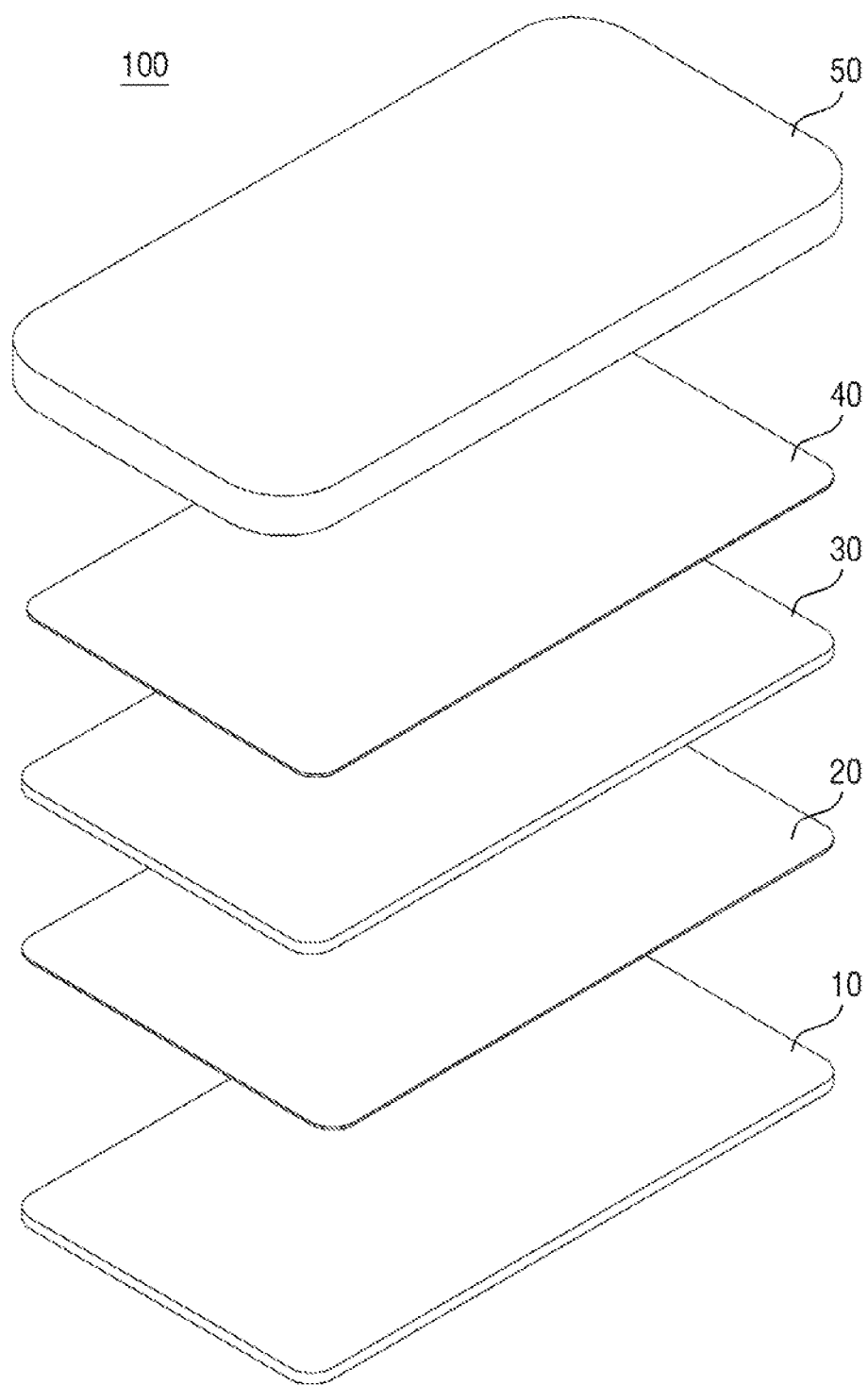
FIG. 1 is an exploded perspective view of a display device according to an embodiment.
Figure 2:
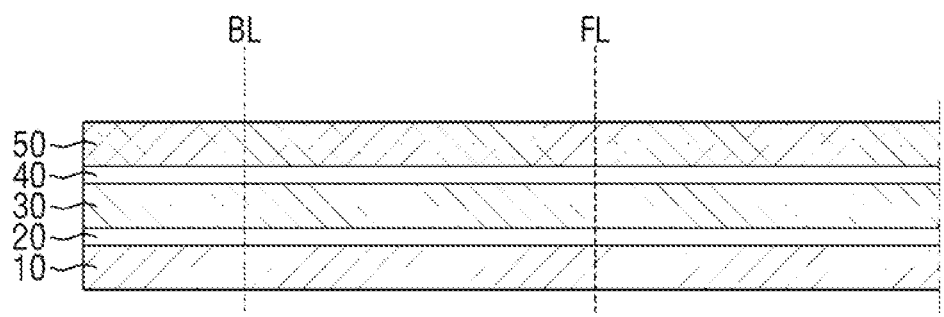
FIG. 2 is a cross-sectional view of a display device according to an embodiment.
Figure 3:
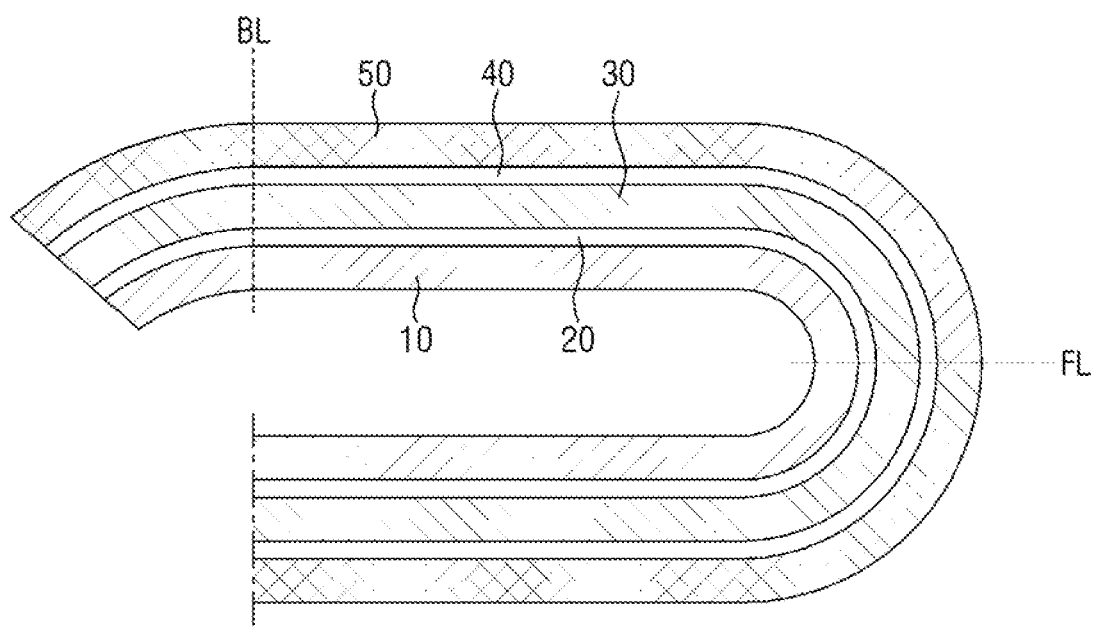
FIG. 3 is a cross-sectional view of a folded state of a display device of FIG. 2.

FIG. 1 is an exploded perspective view of a display device according to an embodiment. FIG. 2 is a cross-sectional view of a display device according to an embodiment. FIG. 3 is a cross-sectional view of a folded state of a display device of FIG. 2.

A display device 100 according to an embodiment includes a plurality of lamination members and at least one optically clear bonding member disposed between adjacent lamination members that attaches the lamination members. A lamination member may be a display member, a touch member, a window member, an optical film, or a cover member. FIGS. 1 and 2 illustrate a case where lamination members, such as a display member 10, a touch member 30, and a window member 50, are sequentially laminated, in which a first optical clear bonding member 20 is disposed between the display member 10 and the touch member 30, and a second optical clear bonding member 40 is disposed between the touch member 30 and the window member 50.

Referring to FIGS. 1 and 2, the display member 10, which displays information or an image using input data signals, may be an organic light emitting display panel, a liquid crystal display panel, a plasma display panel, or an electrophoretic display panel. In an exemplary embodiment, the display member 10 is an organic light emitting display panel.

According to an embodiment, the display member 10 includes a display unit and a driving unit.

According to an embodiment, the display unit includes a plurality of pixels. Each pixel includes a light emitting portion and a circuit portion that controls the amount of light emitted from the light emitting portion. The circuit portion includes display wiring, a display electrode, and at least one transistor. An encapsulation film encapsulates the light emitting portion to prevent moisture or other external contaminants from entering. The encapsulation film may be a single-layer or a multi-layer inorganic film, or a laminated film in which inorganic films and organic films are alternately laminated.

According to an embodiment, the display unit may have a rectangular shape or a rectangular shape with rounded corners. However, embodiments of the present disclosure are not limited thereto, and a display unit according to other embodiments can have various other shapes, such as a square shape, other polygonal shapes, a circular shape, or an elliptical shape.

According to an embodiment, the driving unit is disposed at the periphery of the display unit, such as at one side of the display unit. The driving unit is a non-display unit that does not display an image. Unlike the display unit, the driving unit does not include pixels. When the display unit has a rectangular shape with rounded corners, the driving unit is disposed adjacent to at least one side of the display unit. The driving unit includes driving wiring connected to display wiring of the pixel and a driving wiring pad. External components, such as a driving chip and a printed circuit board, are mounted on the driving wiring pad.

In an embodiment, the display member 10 includes a substrate. The substrate is made of, for example, a flexible plastic material such as polyimide. A circuit portion and a light emitting portion of the display unit are disposed on one surface of the substrate. When the substrate is flexible, the display member 10 can be flexibly deformed by an external force to be folded or bent.

According to an embodiment, the display member 10 includes a protective film. The protective film can reinforce the strength of the flexible substrate or relieve stress in a bent region. The protective film includes an organic coating layer such as polyimide, acrylate, or epoxy. In another embodiment, the protective film is attached in the form of a protection film.

Referring to FIGS. 1 and 2 again, the touch member 30 is disposed over the display member 10. The touch member 30 acquires position information at an input point by using one of a capacitance method, a resistance film method, an electromagnetic induction method or an infrared method. In an embodiment, a capacitance type touching member 30 is disclosed, but embodiments of the present disclosure are not limited thereto.

According to an embodiment, the touch member 30 overlaps the display unit of the display member 10, and partially overlaps the driving unit. The touch member 30 includes a touch substrate and a sensing unit. Like the display member 10, the touch member 30 can have various shapes. FIG. 1 illustrates a case where the touch member 30 has a rectangular shape in a plan view.

According to an embodiment, the touch member 30 is formed of glass or a plastic such as polyethylene terephthalate (PET), polyimide (PI), polycarbonate (PC), polyethylene (PE), polypropylene (PP), polysulfone (PSF), polymethyl methacrylate (PMMA), triacetylcellulose (TAC), or a cycloolefin polymer (COP). Further, the touch member 30 includes a flexible plastic substrate, and may be folded or bent together with the display member 10 as described above.

According to an embodiment, the sensing unit of the touch member 30 includes a touch electrode and/or a touch wiring, and acquires position information of a touched point by a self capacitance method or a mutual capacitance method.

Alternatively, the touch member 30 can be omitted in some cases. In an embodiment, when the display device 100 provides information through the display member 10, the display device 100 does not acquire positional information through the touch member 30 when the devices that receive the information to be displayed are externally disposed from the display device. Further, in an embodiment, the touch member 30 is disposed inside the display member 10, so that the display member 10 and the touch member 30 can be provided as one member. However, embodiments of the present disclosure are not limited thereto, and FIGS. 1 and 2 illustrate a case where the touch member 30 and the display member 10 are separately disposed.

Referring to FIGS. 1 and 2, according to an embodiment, the window member 50 is disposed over the touch member 30. The window member 50 displays information received from the display device 100 to a user. As shown in FIGS. 1 and 2, information or images received from the display member 10 are displayed through the window member 50. The window member 50 is made of a transparent material so that the user can view the information displayed on the display member 10.

Further, according to an embodiment, the window member 50 covers and protects the touch member 30 and display member 10. The window member 50 may have various shapes, like the above-described touch member 30 and display member 10. The window member 50 completely overlaps the touch member 30. The window member 50 is larger than the touch member 30, so that its side surface protrudes from each side surface of the touch member 30. Further, the window member 50 completely overlaps the display unit of the display member 10 as well as the driving unit of the display member 10. The window member 50 is larger than the display member 10, so that its side surface protrudes from each side of the display member 10.

The window member 50 may be made of, for example, glass or plastic. Further, when the window member 50 includes plastic, the window member 50 is flexible. When the window 50 is flexible, it can be folded or bent.

According to an embodiment, even when the window member 50 includes glass, it can be flexible in some cases. For example, when glass is formed into a structure such as a thin film or a film, the window member 50 can be flexible even if it does not include plastic.

According to an embodiment, examples of a plastic suitable for the window member 50 include, but are not limited to, polyimide, polyacrylate, polymethylmethacrylate (PMMA), polycarbonate (PC), polyethylene naphthalate (PEN), polyvinylidene chloride, polyvinylidene difluoride (PVDF), polystyrene, ethylene-vinylalcohol copolymers, polyethersulphone (PES), polyetherimide (PEI), polyphenylene sulfide (PPS), polyallylate, triacetyl cellulose (TAC), or cellulose acetate propionate (CAP). The window member 50 includes at least one of the above-listed plastics.

According to an embodiment, when the window member 50 includes plastic, it further includes a coating layer disposed on the upper and lower surfaces thereof. In an embodiment, the coating layer is a hard coating layer that includes an organic layer or an organic-inorganic composite layer, each of which includes an acrylate compound. The organic layer includes an acrylate compound. The organic-inorganic composite layer has an inorganic material, such as silicon oxide, zirconium oxide, aluminum oxide, tantalum oxide, niobium oxide, or glass beads, dispersed in an organic material, such as an acrylate compound. In an embodiment, the coating layer includes a metal oxide layer. The metal oxide layer contains, but is not limited to, metal oxides of metals such as titanium, aluminum, molybdenum, tantalum, copper, indium, tin, or tungsten.

According to an embodiment, the window member 50 further includes a black matrix at the bottom thereof. Since the side surface of the window member 50 protrudes from the side surfaces of the display member 10 and the touch member 30, the window member 50 covers both the upper surface of the display member 10 and the upper surface of the touch member 30. In this case, the window member 50 overlaps a region connected to the driving unit of the display member 10 or a touch printed circuit board of the touch member 30. When the window member 50 is made of a transparent material, in which case the inside of the display device is visible from the outside, the region connected to the driving unit of the display member 10 or the touch printed circuit board of the touch member 30 needs to be hidden from the outside. Thus, the window member 50 further includes a black matrix at the bottom thereof, so that a part of the lamination member is not visible from the outside. For example, the black matrix overlaps the region connected to the driving unit of the display member 10 or the touch printed circuit board of the touch member 30. However, embodiments of the present disclosure are not limited thereto.

According to an embodiment, a first optical clear bonding member 20 is disposed between the display member 10 and the touch member 30. The display member 10 and the touch member 30 are coupled to each other by the first optical clear bonding member 20. A second optical clear bonding member 40 is disposed between the touch member 30 and the window member 50. The touch member 30 and the window member 50 are coupled to each other by the second optical clear bonding member 40. As described above, when the touch member 30 is omitted or disposed inside the display member 10, the second optical clear bonding member 40 can be omitted together with the touch member 30, and the display member 10 can be directly coupled with the window member 50 through the first optical clear bonding member 20.

According to an embodiment, each of the first optical clear bonding member 20 and the second optical clear bonding member 40 can be formed of an optical clear adhesive (OCA), an optical clear resin (OCR), or a pressure sensitive adhesive (PSA). The first optical clear bonding member 20 and the second optical clear bonding member 40 are made of the same material and have the same structure and the same physical properties. However, in some cases, the first optical clear bonding member 20 and the second optical clear bonding member 40 have different structures and different physical properties even when they are made of the same material. In other cases, the first optical clear bonding member 20 and the second optical clear bonding member 40 are made of different materials. This means that the structures and physical properties of the first optical clear bonding member 20 and the second optical clear bonding member 40 can be appropriately adjusted by the user depending on the structure and use of the display device 100, and may not necessarily be the same as each other. At least one of the first optical clear bonding member 20 and the second optical clear bonding member 40 includes a crack portion, to disperse stress applied to the display device during bending or folding. Details thereof will be described below.

According to an embodiment, when the first optical clear bonding member 20 is disposed on one surface of the touch member 30 and the second optical clear bonding member 40 is disposed on the other surface of the touch member 30, the first optical clear bonding member 20 and the second optical clear bonding member 40 have a planar shape similar to that of the touch member 30.

According to an embodiment, the side surfaces of the first optical clear bonding member 20 and the second optical clear bonding member 40 are disposed inwards from the side surface of the touch member 30. In other words, the side surfaces of the touch member 30 protrude outwards from the side surfaces of the first optical clear bonding member 20 and the side surfaces of the second optical clear bonding member 40. Therefore, an edge portion of one surface of the touch member 30 is not covered by the first optical clear bonding member 20, and an edge portion of the other surface of the touch member 30 is not covered by the second optical clear bonding member 40. Since the first and second optical clear bonding members 20 and 40 are not formed up to the side surface of the touch member 30, overflow of an adhesive material can be prevented in advance.

According to an embodiment, the display device 100 further includes a panel lower sheet. The panel lower sheet includes at least one functional layer. The functional layer may perform a heat radiation function, an electromagnetic wave blocking function, a grounding function, a buffering function, an intensity enhancement function, a support function or a digitizing function. The functional layer may be a sheet layer, a film layer, a thin film layer, a coating layer, a panel, a plate, etc. The functional layer may be composed of a single layer, but may also be composed of a plurality of laminated thin films or coating layers. The functional layer may be, for example, a supporting substrate, a heat-radiating layer, an electromagnetic wave blocking layer, an impact absorbing layer, a digitizer, etc. When the display device 100 includes a panel lower sheet, the panel lower sheet is also integrated into the display member 10 and can be folded or bent together with the display device 100.

Figure 4:
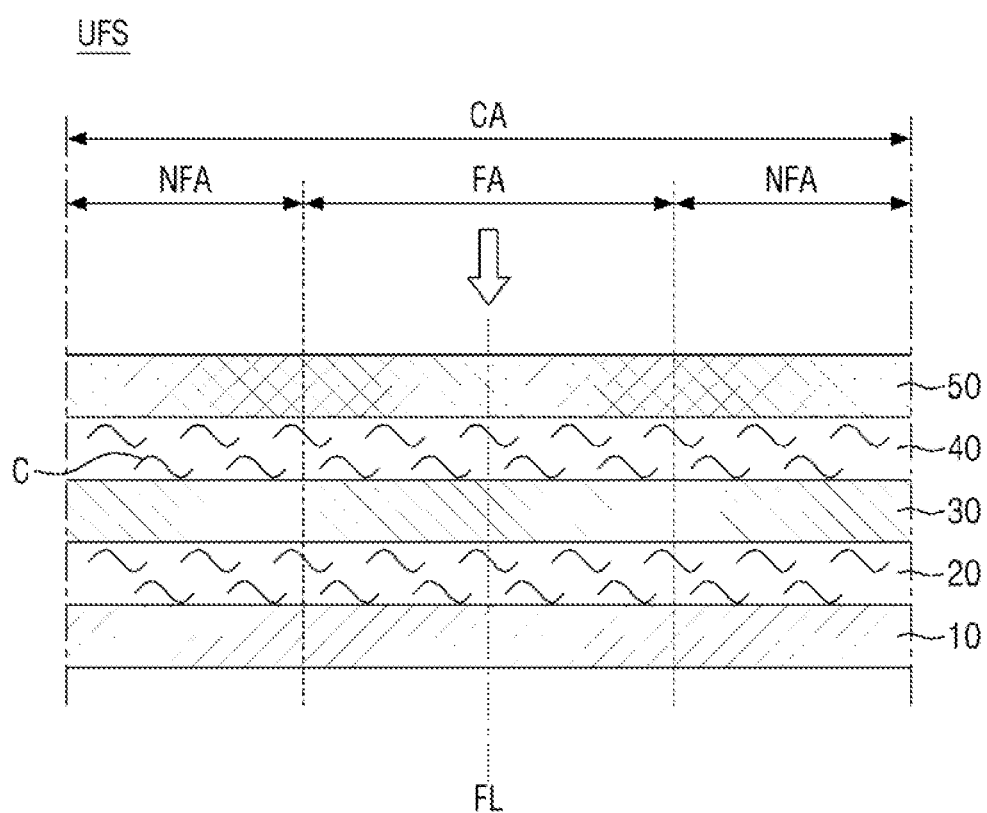
FIG. 4 is an enlarged cross-sectional view of the display device of FIG. 2.

As described above, according to an embodiment, the display member 10, the touch member 30, the window member 50, etc., of the display device 100 include flexible plastic. For example, as shown in FIGS. 2 and 3, the display device 100 includes flexible members that can be folded or bent. The display device 100 has an area between a folding line FL and a bending line BL, referred to as a folding area FA or a bending area BA, and a non-folding area NFA or a non-bending area NBA, as shown in FIG. 4. As shown in FIGS. 2 and 3, based on the folding line FL, one side area of the display device 100 can be folded 180° or more with respect to the other side area. Further, based on the bending line BL, a side portion of the one side area can be bent upward or downward at a specific angle with respect to the other side area. However, embodiments of the present disclosure are not limited thereto, and the entire area of the display device 100 can be folded or bent without reference to a specific folding line FL or a bending line BL.

For example, according to an embodiment, a folding line FL and a bending line BL can be defined on the display device 100, which can be bent or warped with respect to the folding line FL or the bending line BL. Since the display device 100 is bent or warped with respect to the folding line FL or the bending line BL, the display device 100 includes a folding area FA or a bending area BA where the display device 100 is curved. The display device 100 further includes a non-folding area NFA or a non-bending area NBA, which an area on the display device 100 other than the folding area FA or the bending area BA. When the display device 100 is folded or bent, the display device 100 partially overlaps in the non-folding area NFA or the non-bending area NBA depending on the degree of folding or bending of the display device 100. For example, one side of the folded or bent substrate in the overlapping area may be viewed from a direction opposite to the one side of the non-folding area NFA or non-bending area NBA of the display device 100.

As used herein, according to an embodiment, the 'unfolded state' or 'unbent state' refers to a state in which a flexible member is relatively flat without being bent or bent, and the 'folded state' or 'bent state' refers to a state in which a flexible member is deformed and at least a part thereof is folded or bent. For example, a state in which a part of the display device 100 is folded by an external force acting on a flexible member is referred to as a folded state (FS), and a state in which the folded portion is spread by removing the external force is referred to as a unfolded state (UFS). As another example, a state in which a part of the display device 100 is bent by an external force acting on a flexible member is referred to as a 'bent state (BS)', and a state in which the bent portion is spread by removing the external force is referred to as an unbent state (UBS). However, embodiments of the present disclosure are not limited thereto. Even when the display device 100 is bent, curved or deformed without being subjected to an external force, it may be understood as being in a folded state or a bent state.

As shown in FIG. 3, according to an embodiment, when the display device 100 is folded or bent with respect to the folding line FL or the bending line BL, the plurality of lamination members, for example, the display member 10, the touch member 30, the window member 50, and the first and second optical clear bonding members 20 and 40 are subject to stress due to the folding or bending. Here, if the stress transferred to the first optical clear bonding member 20 and the second optical clear bonding member 40 is not dispersed or removed, the first optical clear bonding member 20 and the second optical clear bonding member 40 can separated from each other due to reduced adhesion forces at the interface with the laminating members, and lifting or bubbling can occur between the laminating members.

A deformation rate the display device 100 can be increased by controlling physical properties of the optical clear bonding member, such as density and viscosity, to prevent these phenomena. However, in this case, when the first optical clear bonding member 20 and the second optical clear bonding member 40 are pressed together, the first optical clear bonding member 20 and the second optical clear bonding member 40 protrude from the side surfaces of the lamination members, thereby generating foreign matter. The floating and bubbling that occur between the lamination members in the display device 100 and the formation of foreign mater can be visually recognized from the outside of the display device 100, thereby deteriorating the quality of the display device 100.

Therefore, according to an embodiment, to disperse or remove the stress transferred to the first optical clear bonding member 20 and the second optical clear bonding member 40 by folding or bending, at least one of the first optical clear bonding member 20 and the second optical clear bonding member 40 includes a crack portion CA in the matrix of an adhesive resin that contains crack units C. Details thereof will be described with reference to FIG. 4 to 7.

Hereinafter, according to an embodiment, a case where a flexible display device 100 is folded will be described. However, embodiments of the present disclosure are not limited thereto.

Figure 5:
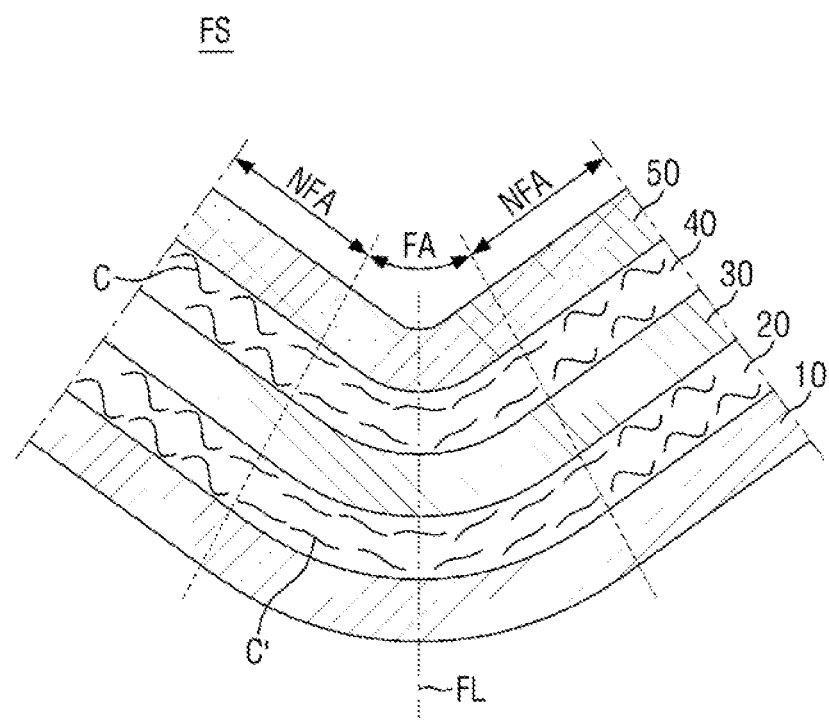
FIG. 5 is a cross-sectional view of a folded state where the display device is bent with respect to a folding line in a specific region of a display device of FIG. 4.

FIG. 4 is an enlarged cross-sectional view of a display device of FIG. 2. FIG. 5 is a cross-sectional view of a folded state where a display device is bent with respect to a folding line in a specific region of a display device of FIG. 4.

Referring to FIGS. 4 and 5, according to an embodiment, the display device 100 includes a folding line FL in a specific area, a folding area FA in which the display device 100 is bent based on the folding line FL, and a non-folding area NFA in which the display device 100 is not bent. The folding line FL, the folding area FA and the non-folding area NFA are areas that describe the structural and morphological changes of the lamination members and the bonding members when the display device 100 is in the folded state FS or the unfolded state UFS. However, these areas are defined for convenience of explanation, and embodiments of the display device 100 of the present disclosure are not limited thereto.

As shown in FIG. 4, according to an embodiment, when the display device 100 is in the unfolded state UFS, the display member 10, the touch member 30, the window member 50, the first optical clear bonding member 20, and the second optical clear bonding member 40 maintain a relatively flat shape. In the unfolded state UFS, flexible members are in a state in which there is no stress due to folding. Therefore, an adhesion force of the first optical clear bonding member 20 and the second optical clear bonding member 40 do not decrease at the interfaces with the display member 10, the touch member 30 and the window member 50, and maintain a relatively strong coupling.

In contrast, as shown in FIG. 5, according to an embodiment, when the display device 100 is in the folded state FS, the first optical clear bonding member 20 and the second optical clear bonding member 40 transmit stress to the folding area FA and the non-folding area NFA according to the deformation. The folding area FA is an area adjacent to the folding line FL. Since a folding range of the folding area FA is relatively larger than a folding range of the non-folding area NFA, a larger stress is transferred to the folding area FA. The stress transferred to the first optical clear bonding member 20 and the second optical clear bonding member 40 acts as a repulsive force to return to the unfolded state UFS, which reduces the adhesion force at the interface with the display member 10, the touch member 30, and the window member 50. Accordingly, the interfacial adhesion force of the first optical clear bonding member 20 and the second optical clear bonding member 40 with the lamination members at the side of the non-folding area NFA located opposite the folding area FA is reduced, and thus the lamination members can detach from each other. In the crack portion CA included in the first optical clear bonding member 20 and the second optical clear bonding member 40, the crack units C of the crack portion CA in the folded state FS change in structure or shape as compared to the unfolded state UFS, and thus the transferred stress can be dispersed or reduced. Accordingly, the stress transferred to the first optical clear bonding member 20 and the second optical clear bonding member 40 is reduced, so that the interfacial adhesion force can be maintained.

According to an embodiment, the crack units C are formed by breaking some bonds in the matrix formed by an adhesive resin. That is, the crack units C can be understood as cracks or wrinkles in which the bonding of the adhesive resin matrix is not continuous. The crack portion CA is a specific area in which at least one crack unit C is formed in the first optical clear bonding member 20 and the second optical clear bonding member 40. As shown in FIG. 4, when the crack unit C is formed in the entire area of the first optical clear bonding member 20 and the second optical clear bonding member 40, the crack portion CA refers to the entire area where the crack unit C is formed. However, embodiments of the present disclosure are not limited thereto. As will be described below, the crack portion CA can also be any discontinuous area where voids V can be pressed and formed when the first optical clear bonding member 20 and the second optical clear bonding member 40 are formed.

According to an embodiment, the "matrix" is a substrate or layer formed of a polymer such as a resin. For example, the first optical clear bonding member 20 and the second optical clear bonding member 40 are formed by partially curing an adhesive resin and then pressing the partially cured adhesive resin together with members to be adhered. Here, the matrix formed by an adhesive resin is a substrate formed by partially curing the adhesive resin, or a substrate included in the first optical clear bonding member 20 or the second optical clear bonding member 40. However, embodiments the present disclosure are not limited thereto, and the matrix may be a substrate formed by completely curing a polymer, or a substrate directly formed by a fluidic polymer without being cured. Details of the crack unit C and the adhesive resin matrix will be described below.

Referring to FIG. 5, according to an embodiment, the cracking units C in the folded state FS are relatively flattened in comparison with the unfolded state UFS. Further, the reduction of the transferred stress depends on the change of the length of the crack unit C in a first-axis direction and the length thereof in a second-axis direction perpendicular to the first-axis direction. Hereinafter, details thereof will be described with reference to FIGS. 6 and 7.

Figure 6:
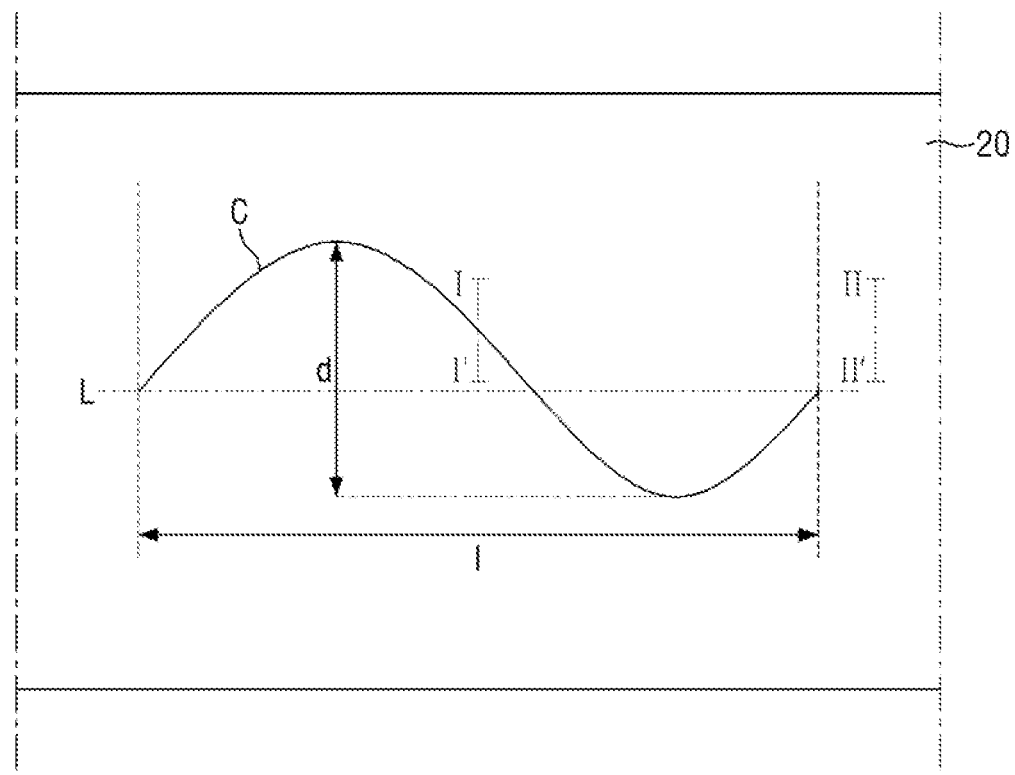
FIG. 6 illustrates a shape of a crack unit in an unfolded state of a display device according to an embodiment.
Figure 7:
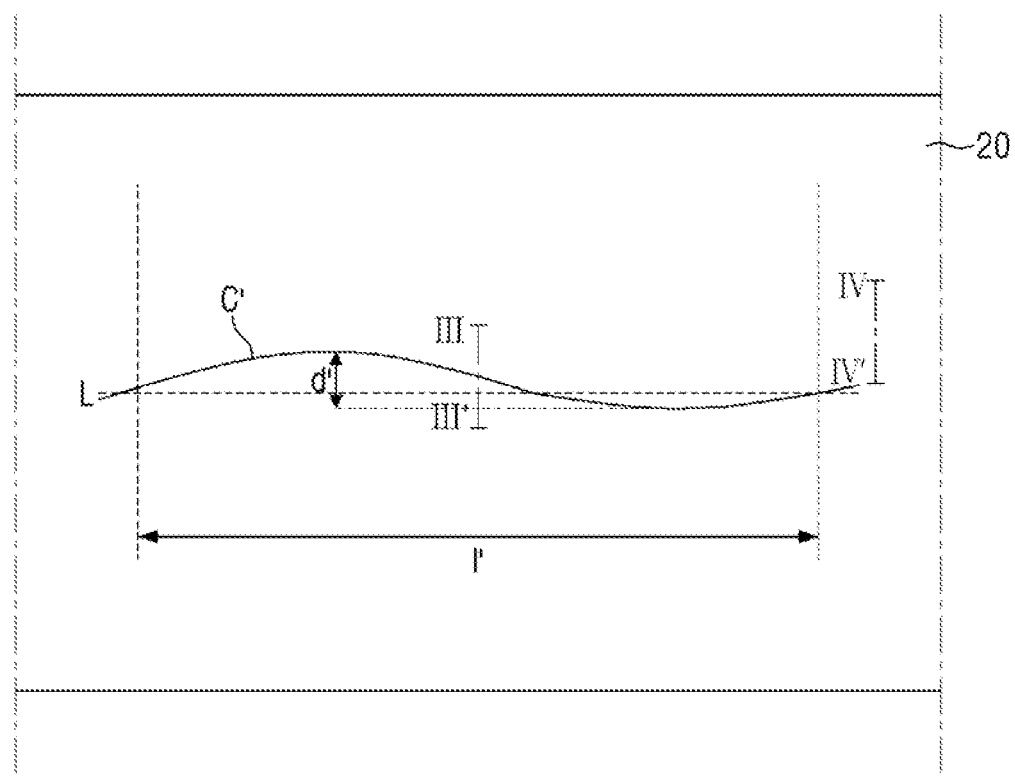
FIG. 7 illustrates a shape of a crack unit in a folded state of a display device according to an embodiment.

FIG. 6 is a schematic view of a shape of a crack unit in an unfolded state of a display device according to an embodiment. FIG. 7 is a schematic view of a shape of a crack unit in a folded state of a display device according to an embodiment.

According to an embodiment, the crack units C have a curved shape, not a linear shape. However, the shape of the crack unit C is not limited thereto, and FIGS. 6 and 7 illustrate examples of the structural change of the crack unit C when the display device 100 is folded.

Referring to FIG. 6, according to an embodiment, the crack unit C can be defined by a length l that is a horizontal linear distance between a first end and a second end opposite to the first end and a height d that is a vertical distance between the highest and lowest points of a sine curve with respect to a horizontal line L between the first end and the second end.

Referring to FIG. 7, according to an embodiment, when the display device is folded, an external force is applied parallel with the direction of the height d of the crack unit C', and stress is transferred parallel with the direction of the horizontal line L. That is, the stress is transferred in a direction perpendicular to the height d of the crack unit C'. Therefore, the curvature of the crack unit C' in the folded state FS is reduced as compared to the curvature of the crack unit C' in the unfolded state UFS. The length l' increases (l'>l), and the height d' decreases (d>d').

According to an embodiment, the lines I-I' and II-II' in FIG. 6 are arbitrary regions in the first optical clear bonding member 20 and the second optical clear bonding member 40 that each include the crack units C. The line I-I' passes through one crack unit C, but the line II-II' does not pass through the crack unit C. The lines III-III' and IV-IV' in FIG. 7 correspond to the lines I-I' and II-II' in FIG. 6, respectively. When the display device 100 is folded, the stresses transmitted to the reference lines exhibit different characteristics.

According to an embodiment, for convenience of explanation, let a first matrix region of the adhesive resin of the first optical clear bonding member 20 and the second optical clear bonding member 40 include line I in FIG. 6 and line III in FIG. 7 and let a second matrix region of the adhesive resin include line I' in FIG. 6 and line III' in FIG. 7. Further, let a third matrix region include line II in FIG. 6 and line IV in FIG. 7 and let a fourth matrix region include line II' in FIG. 6 and line IV' in FIG. 7.

According to an embodiment, the matrix of the adhesive resin is elastic, so that a repulsive force acts upon deformation to return to the original state. Line II-II' in FIG. 6 and line IV-IV' in FIG. 7 form a boundary between the third matrix region of the adhesive region and the fourth matrix region of the adhesive resin, and are regions where the matrix of the adhesive resin forms a chemical bond. When the display device 100 is in the folded state FS, a repulsive force due the matrix bonding formed between the third matrix region and the fourth matrix region acts to return to the unfolded state UFS.

In contrast, according to an embodiment, line I-I' in FIG. 6 and line III-III' in FIG. 7 is the crack unit C forms a boundary between the first matrix region and the second matrix region. Since the crack unit C includes fine voids, at this boundary, the matrix of the adhesive resin has a region where no chemical bonds are formed. Accordingly, even if the structure or shape of the crack unit C changes due to the display device 100 being in the folded state FS, no repulsive force due the matrix bonding acts to return to the unfolded state UFS.

That is, according to an embodiment, when the first optical clear bonding member 20 and the second optical clear bonding member 40 include the crack portion CA, when the display device 100 is folded, no repulsive force is applied to the matrix of the adhesive resin even if the structure or shape of the crack unit C changes, so that a portion where no stress is transmitted is formed to disperse or reduce the stress. Therefore, an adhesion force can be maintained at the interface between the first optical clear bonding member 20 and the second optical clear bonding member 40 and the display member 10, the touch member 30 and the window member 50, which can prevent a floating phenomenon and generation of air bubbles from occurring in the display device 100.

According to an embodiment, as described above, the cracking unit C forms a region where the bonding of the matrix of the adhesive resin is broken. At the time of manufacturing the first optical clear bonding member 20 and the second optical clear bonding member 40, voids are formed in the adhesive resin, and these voids are pressed to form the crack units C. Details thereof will be described with reference to FIGS. 8 to 12.

FIGS. 8 to 12 illustrate a method of manufacturing a display device according to an embodiment.

A display device according to an embodiment can be manufactured by preparing optical clear bonding portions 20' and 40', placing these optical clear bonding portions 20' and 40' between a display member 10 and a touch member 30 and between a touch member 30 and a window member 50, and then pressing these members. Hereinafter, first, a method of preparing the optical clear bonding portions 20' and 40' will be described in detail.

Figure 8:
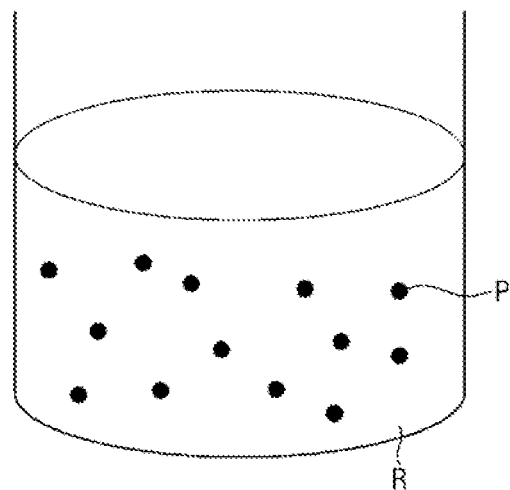
FIGS. 8 to 12 illustrate a method of manufacturing a display device according to an embodiment.

First, referring to FIG. 8, according to an embodiment, acid-soluble particles P are mixed with an adhesive resin R to prepare a resin mixture in which the acid-soluble particles P are dispersed in the adhesive resin R. The adhesive resin R is contained in the first optical clear bonding member 20 and the second optical clear bonding member 40 and has an adhesion force that bonds the lamination members.

According to an embodiment, the acid-soluble particles P are dispersed in the adhesive resin R and form voids V as will described below. The acid-soluble particles P are not particularly limited as long as they can be dissolved by acid treatment to form the voids V. For example, the acid-soluble particles P may be calcium carbonate ($CaCO_3$) particles or magnesium carbonate ($MgCO_3$) particles. The size or shape of the acid-soluble particles P can vary depending on the size of the crack units C to be formed, the ratio of the crack portion CA in the optical clear bonding members, etc. The diameter of the acid-soluble particles P can range from several tens of nanometers (nm) to several micrometers (μm), but is not limited thereto.

Figure 9:
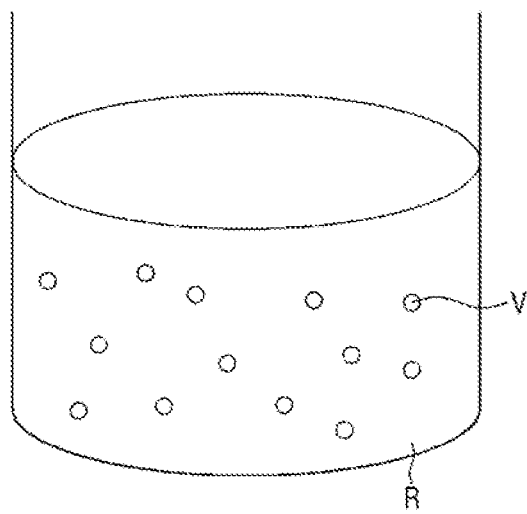
Figure 10:
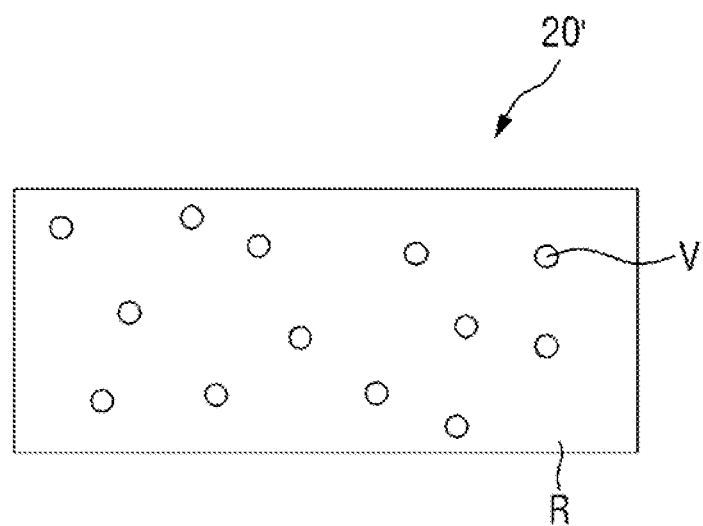

As shown in FIGS. 8 to 10, according to an embodiment, the shape of the acid-soluble particles P may be spherical, but is not limited thereto. The shape of the acid-soluble particles P may be spherical, cubic, or hexahedral depending on the kind of the acid-soluble particles P. FIGS. 8 to 10 illustrate a case where the acid-soluble particles P are spherical particles.

According to an embodiment, the adhesive resin R includes a hydrophobic polymer chain, whereas each of the acid-soluble particles P has a hydrophilic surface. In this case, when the acid-soluble particles P and the adhesive resin R are stirred, the acid-soluble particles P precipitate or agglomerate to be nonuniformly dispersed in the adhesive resin R. Thus, it is not possible to control a region where the crack portions CA form in the first optical clear bonding member 20 and the second optical clear bonding member 40. Therefore, to allow the acid-soluble particles P to be well dispersed in the adhesive resin R, a process of hydrophobically treating the surface of the acid-soluble particles P is performed.

According to an embodiment, the process of hydrophobically treating the surface of the acid-soluble particles P is not particularly limited. For example, the surface of the acid-soluble particles P can be hydrophobically treated by mixing ethanol and stearic acid with the acid-soluble particles P. The surface treatment of the acid soluble particles (P) can be carried out before stirring with the adhesive resin R.

Next, according to an embodiment, as shown in FIG. 9, the resin mixture in which the acid-soluble particles P are dispersed in the adhesive resin R is acid-treated to dissolve the acid soluble particles P to prepare a resin mixture in which voids are formed. When the resin mixture is acid-treated, the acid-soluble particles P are removed, and voids V are formed at the sites of the acid-soluble particles P. As described above, the sites where the voids V are formed becomes a region where the bonding of the matrix of the adhesive resin of the crack portion CA is broken. Here, the acid-treatment solution is not particularly limited as long as it is sufficiently acidic to dissolve the acid-soluble particles P without influencing the deformation of the adhesive resin R. For example, as the acid-treatment solution, an acidic solution of hydrochloric acid (HCl), diluted sulfuric acid ($H_2SO_4$), phosphoric acid ($H_2PO_5$), or acetic acid ($CH_3COOH$) may be used.

Then, according to an embodiment, as shown in FIG. 10, the resin mixture having the voids V formed therein is heat-treated to form optical clear bonding portions 20' and 40'. The heat treatment can be appropriately controlled based on of the kind of the adhesive resin R, the density of the voids V, and the degree of dispersion. For example, the optical clear bonding portions 20' and 40' can be prepared by heat-treating the resin mixture of the adhesive resin R having the voids V formed therein at 220° C. for 1 hour, but embodiments of the present disclosure are not limited thereto. The resin mixture having the voids is heat-treated to partially cure the resin to form an adhesive resin matrix. The adhesive resin matrix includes the voids V formed by the acid-soluble particles P and forms the substrates of the optical clear bonding portions 20' and 40'. The adhesive resin has an adhesion force to attach the lamination members to each other by forming matrix bonds, and is elastic so that the display device 10 can be folded.

Figure 11:
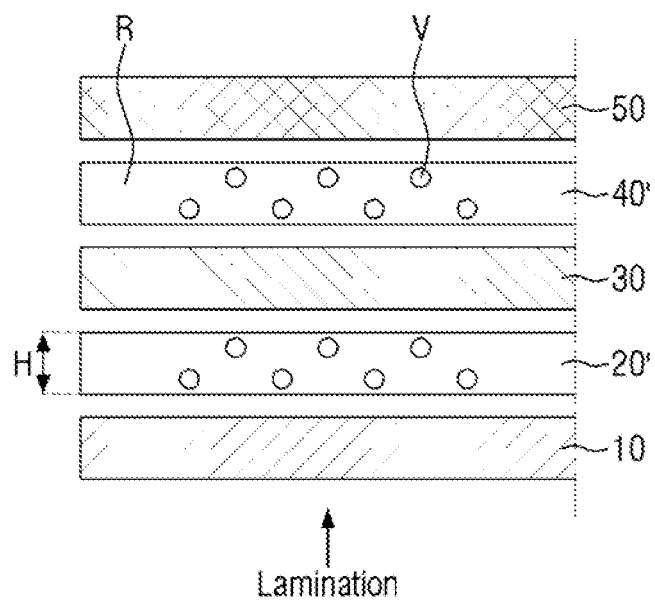
Figure 12:
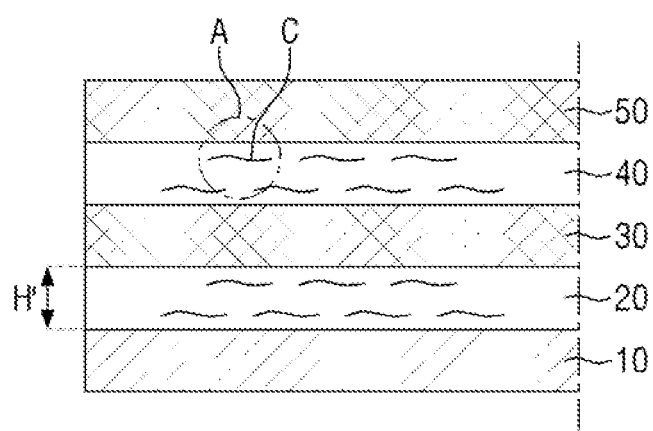

Next, according to an embodiment, as shown in FIGS. 11 and 12, the lamination members are pressed and attached to each other using the optical clear bonding portions 20' and 40' having the voids V. The lamination members, namely the display member 10, the touch member 30 and the window member 50, are sequentially laminated, and the optical clear bonding portions 20' and 40' are disposed between the display member 10 and the touch member 30 and between the touch member 30 and the window member 50, respectively. Then, a lamination process is carried out to press the laminated members, and the display member 10, the touch member 30, and the window member 50 are coupled to each other, thereby manufacturing the display device 100.

Here, according to an embodiment, as shown in FIG. 12, the voids V formed in the optical clear bonding portions 20' and 40' are pressed by the lamination process to form crack units C. The voids V in the optical clear bonding portions 20' and 40' are pressed in the lamination direction, and the matrixes of the adhesive resin R in the upper and lower regions of the voids V contact each other. However, since the matrixes of the adhesive resin R in contact with each are not heat-treated, matrix bonds are not formed. That is, the region where the voids V are formed only forms a physical contact with no chemical bonds. Thus, the stress due to a repulsive force is not transferred to the crack units C formed by pressing the voids V even when the display device 100 is in the folded state FS.

Referring to FIGS. 11 and 12 again, according to an embodiment, the thickness H of each of the optical clear bonding portions 20' and 40' is greater than the thickness H' of the first optical clear bonding member 20 or the second optical clear bonding member 40 after pressing (H>H'). Since the voids V formed in the optical clear bonding portions 20' and 40' are pressed and the matrixes of the upper and lower adhesive resins are in contact with each other, the thickness of each of the optical clear bonding portions 20' and 40 is reduced by the space occupied by the voids V.

According to an embodiment, this means that the thicknesses of the first and second optical clear bonding members 20 and 40 can be adjusted depending on the content of the voids V included in the optical clear bonding portions 20' and 40', that is, the mixing ratio of the adhesive resin R and the acid-soluble particles P. For example, when the percentage of a volume where the voids V are formed in the optical clear bonding portions 20' and 40' is 50%, the thickness H of each of the optical clear bonding portions 20' and 40' is twice the thickness H' of each of the first and second optical clear bonding members 20 and 40. According to an embodiment, the content of the voids V included in the optical clear bonding portions 20' and 40' can be set to be 10% to 50% of the thickness H of each of the optical clear bonding portions 20' and 40'.

Further, according to an embodiment, the change in thickness (H→H') is related to the density of the crack portions CA formed in the first and second optical clear bonding members 20 and 40. That is, as a large number of the acid-soluble particles P are dispersed to form a large number of the voids V, the thickness change increases, and the density of the crack portions CA increases. That is, the decrease in thickness (H→H') of the optical clear bonding portions 20' and 40' is inversely proportional to the fraction of the voids V formed in the optical clear bonding portions 20' and 40'. The fact that the density of the crack portions CA is high means that stress can be widely dispersed when the display device 100 is folded. Therefore, the density of the crack portions CA formed by controlling the ratio of the acid-soluble particles P to the adhesive resin R can be controlled, and the thickness and deformation rate of each of the first and second optical clear bonding members 20 and 40 can be adjusted as needed.

According to an embodiment, through the above-described process, the crack portions CA can be formed in the first and second optical clear bonding members 20 and 40. However, as shown in FIGS. 6 and 7, although the crack units C have a curved linear shape formed by pressing the void Vs, embodiments of the present disclosure are not limited thereto.

Figure 13:
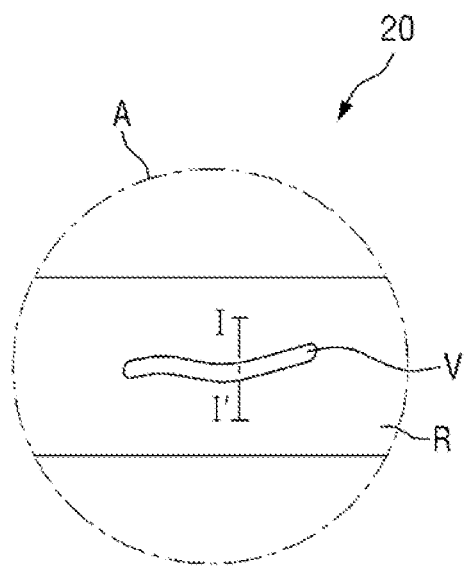
FIGS. 13 to 15 illustrate a shape of a crack unit according to an embodiment.
Figure 14:
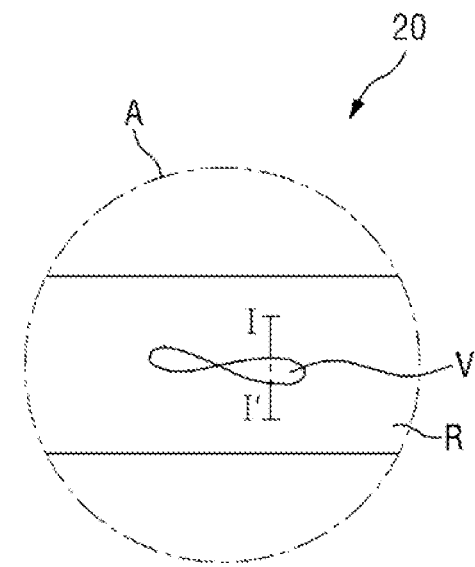
Figure 15:
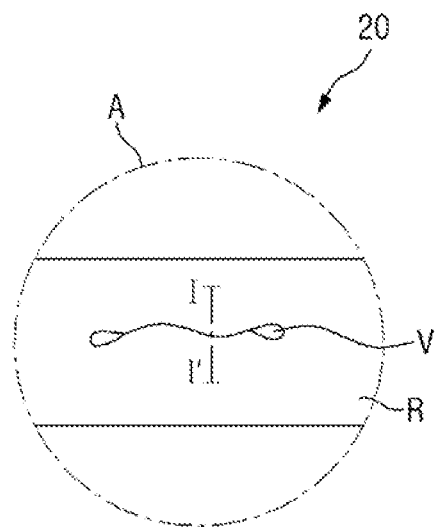

FIGS. 13 to 15 illustrate the shape of a crack unit according to an embodiment.

According to an embodiment, it can be seen that at least a part of the void V included in each of the optical clear bonding portions 20' and 40' is present in the crack unit C of FIGS. 13 to 15. In the process of pressing the lamination members and the optical clear bonding portions 20' and 40', the matrices of the adhesive resins R of the optical clear bonding portions 20' and 40' do not completely contact with each other. FIG. 13 shows a case where the upper and lower surfaces of the matrix of the adhesive resin R around the void V do not contact each other. The crack unit C of FIG. 14 shows a case where the upper and lower surfaces of the matrix of the adhesive resin R are in contact with each other at one point in the void V, and the crack unit C of FIG. 15 shows a case where the upper and lower surfaces of the matrix of the adhesive resin R are in contact with each other at most points in the void V.

According to an embodiment, when a void V is partially formed in the crack unit C, the structure or shape of the crack unit C is flexibly deformed when the display device 100 is folded. Since no chemical bonds are formed between the upper matrix region and the lower matrix region around the void V and the physical connection is weak, the crack unit C has a structure that can disperse the transferred stress. However, when there are too many voids V in the crack unit C, repeated folding and unfolding of the display device 100 can cause the thicknesses of the first optical clear bonding member 20 and the second optical clear bonding member 40 to vary in some areas, and thus a uniform shape is not maintained. Therefore, the voids V in the crack unit C are included to such a degree that the shape can be maintained while dispersing the transferred stress.

However, in an embodiment, the cracking unit C shown in FIGS. 13 to 15 includes a region in the section I-I' where the bonding of the matrix of the adhesive resin R is not formed. As described above, this is a region where no repulsive force due to the bonding of the matrix of the adhesive resin R is applied. Therefore, the crack unit C can have various structures, depending on the degree of pressing, but includes a region where the matrix of the adhesive resin R is not bonded, so as to disperse the stress transferred when folding the display device 100.

According to an embodiment, since the crack unit C is formed by pressing the voids V formed by dissolving the acid-soluble particles (P) by an acid treatment, the crack unit C is so small that it is challenging for a user to visually recognize the crack unit C. Further, since the size of the crack unit C is small even when the crack unit C is formed at the interface where the first and second optical clear bonding members 20 and 40 contact the lamination members, the crack unit C does not influence the adhesion force of the adhesive resin R.

According to an embodiment, referring to FIGS. 4 and 5 again, when the display device 100 is in a folded state FS, in the first and second optical clear bonding members 20 and 40, the stress transferred to an area in the folding area FA differs from the stress transferred to an area in the non-folding area NFA. Since the folding area FA is adjacent to the folding line FL, the folding area FA is deformed as compared with the non-folding area NFA. Therefore, the stress transferred by folding can be effectively dispersed by adjusting the area where the crack portions CA are formed in the first and second optical clear bonding members 20 and 40. That is, whether or not the crack portions CA can form or the density of the formed crack portions CA can change, depending on the folding area FA and the non-folding area NFA. Hereinafter, other embodiments of the first and second optical clear bonding members 20 and 40 will be described with reference to FIGS. 16 to 27.

According to an embodiment, for convenience of explanation, FIGS. 16 to 27 show an area where the display member 10, the first optical clear bonding member 20, and the touch member 30 are laminated. As described above, the second optical clear bonding member 40 includes the same material as the first optical clear bonding member 20, and has the same structure and physical properties as the first optical clear bonding member 20. Further, in some cases, the second optical clear bonding member 40 may have different structure and physical properties from the first optical clear bonding member 20. However, embodiments of the present disclosure are not limited thereto. Further, as shown in FIGS. 6 and 7, a curved crack unit C will be described by way of example. However, embodiments of the present disclosure are not limited thereto, and the crack unit C may have various shapes as shown in FIGS. 13 to 15.

Figure 16:
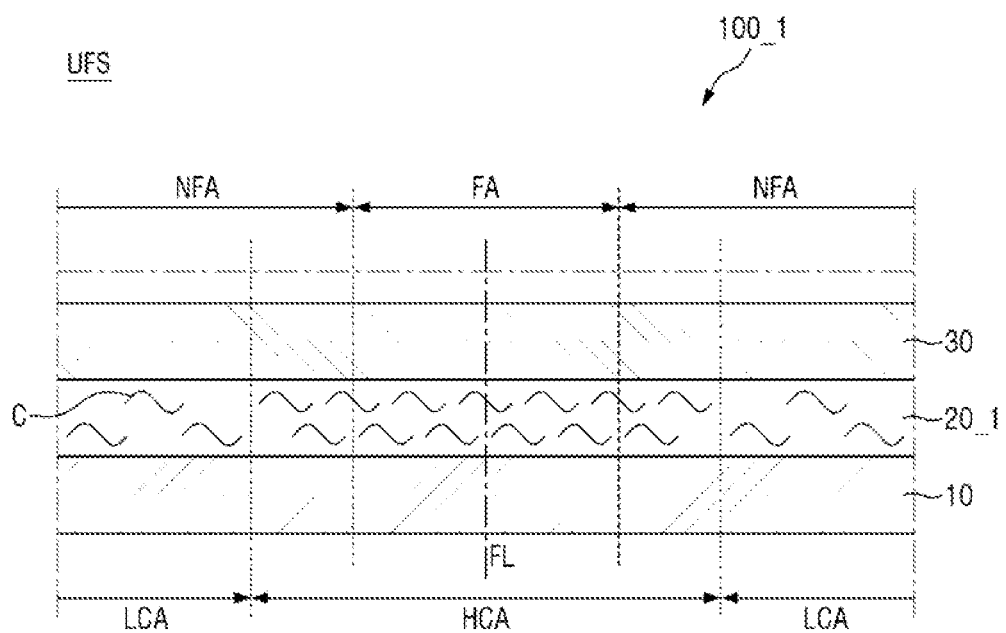
FIG. 16 is a cross-sectional view of a first optical clear bonding member of a display device according to an embodiment.
Figure 17:
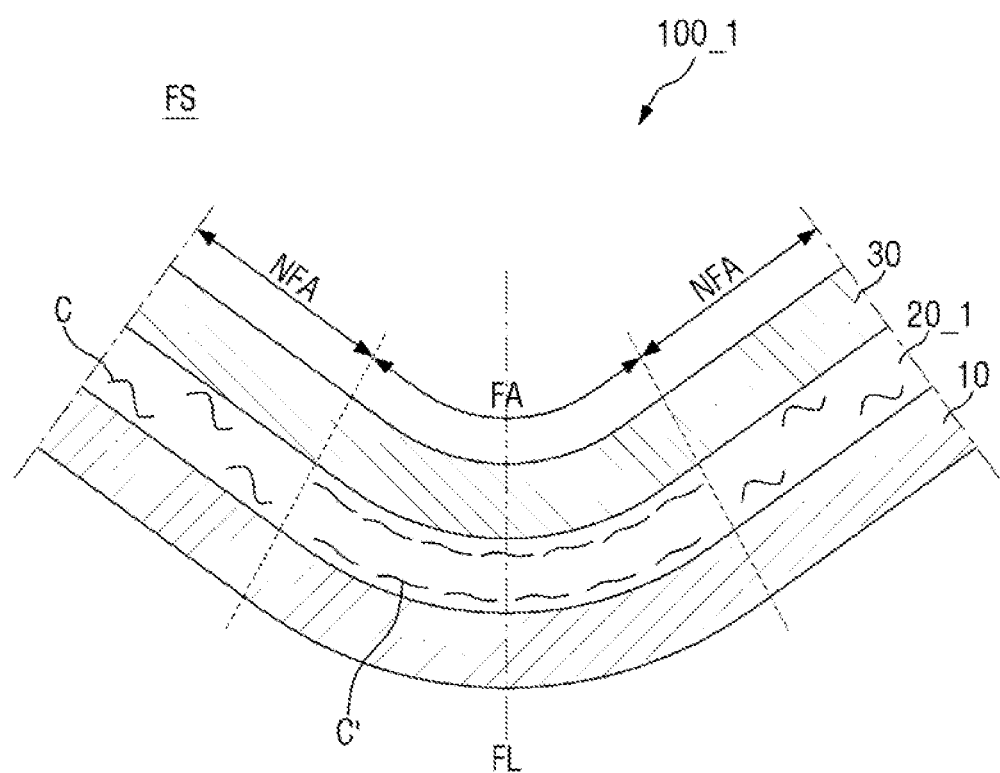
FIG. 17 is a cross-sectional view of a folded state of a display device of FIG. 16.

FIG. 16 is a cross-sectional view of the first optical clear bonding member when the display device according to an embodiment is in an unfolded state. FIG. 17 is a cross-sectional view of the first optical clear bonding member when the display device of FIG. 16 is in a folded state.

Referring to FIGS. 16 and 17, according to an embodiment, the first optical clear bonding member 20 includes a crack portion CA, and the crack portion CA is disposed with a non-uniform density in a first optical clear bonding member 20_1. That is, there is a higher density of crack portions in some of regions than in other regions. The display device 100_1 shown in FIGS. 16 and 17 is substantially the same as the display device 100 shown in FIGS. 4 and 5, except that the density of the crack portions CA disposed in the first optical clear bonding member 20_1 is different. Hereinafter, differences of the display device 100_1 according to an embodiment will be described.

Referring to FIGS. 16 and 17, according to an embodiment, the display device 100_1 has a folding line FL and a folding area FA and a non-folding area NFA. Further, there is an area that overlaps the folding area FA and the non-folding area NFA in the first optical clear bonding member 20_1.

As described above, according to an embodiment, when the display device 100_1 is folded at the folding line FL, more stress is transferred to the folding area FA than to the non-folding area NFA. The crack portion CA disperses the transferred stress. As a larger number of crack units C are formed, the stress is widely dispersed.

According to an embodiment, to effectively reduce the stress transferred to the first optical clear bonding member 20_1, the first optical clear bonding member 20_1 includes a first crack portion LCA having a low density of crack units C and a second crack portion HCA having a high density of crack units C. The density of crack units in the first crack portion LCA is lower than the density of crack units in the second crack portion HCA. At least a part of the second crack portion HCA overlaps the folding area FA. The folding area FA to which more stress is transferred overlaps the high density second crack portion HCA, thereby effectively dispersing the transferred stress.

According to an embodiment, as described above, the first crack portion LCA and the second crack portion HCA can be formed by controlling the mixing ratio of the adhesive resin R and the acid-soluble particles P and the stirring time and stirring speed when preparing the first optical clear bonding member 20_1. The degree of densification of the region where the crack portions CA are formed on the first optical clear bonding member 20_1 can be adjusted by adjusting the degree of dispersion of the acid-soluble particles P in the adhesive resin R. The density distribution of crack units C at the interface between the first crack portion LCA and the second crack portion HCA has a sharp density difference, and may have a linear shape or a gently curved shape. However, embodiments of the present disclosure are not limited thereto.

According to an embodiment, the first optical clear bonding member 20_1 includes a non-crack portion NCA in at least a part of an area that overlaps the folding area NSA in which no crack units C are formed. The crack portion CA is not formed in the non-folding area NFA to which less stress is transferred, but is formed only in the folding area FA, thereby intensively dispersing transferred stress when the display device 100_1 is folded. Hereinafter, an first optical clear bonding member 20_1 that includes a non-crack portion NCA in which no crack units C are formed will be described with respect to FIGS. 18 and 19.

Figure 18:
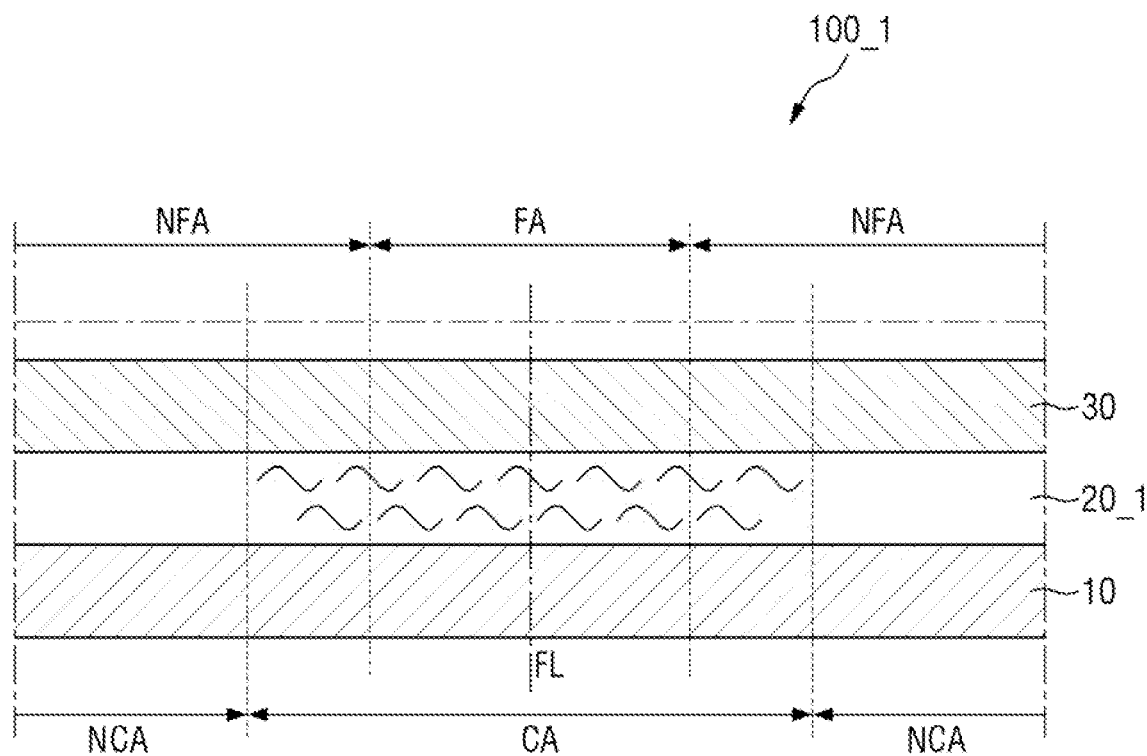
FIGS. 18 and 19 are cross-sectional views of a first optical clear bonding member of a display device according to another embodiment.
Figure 19:
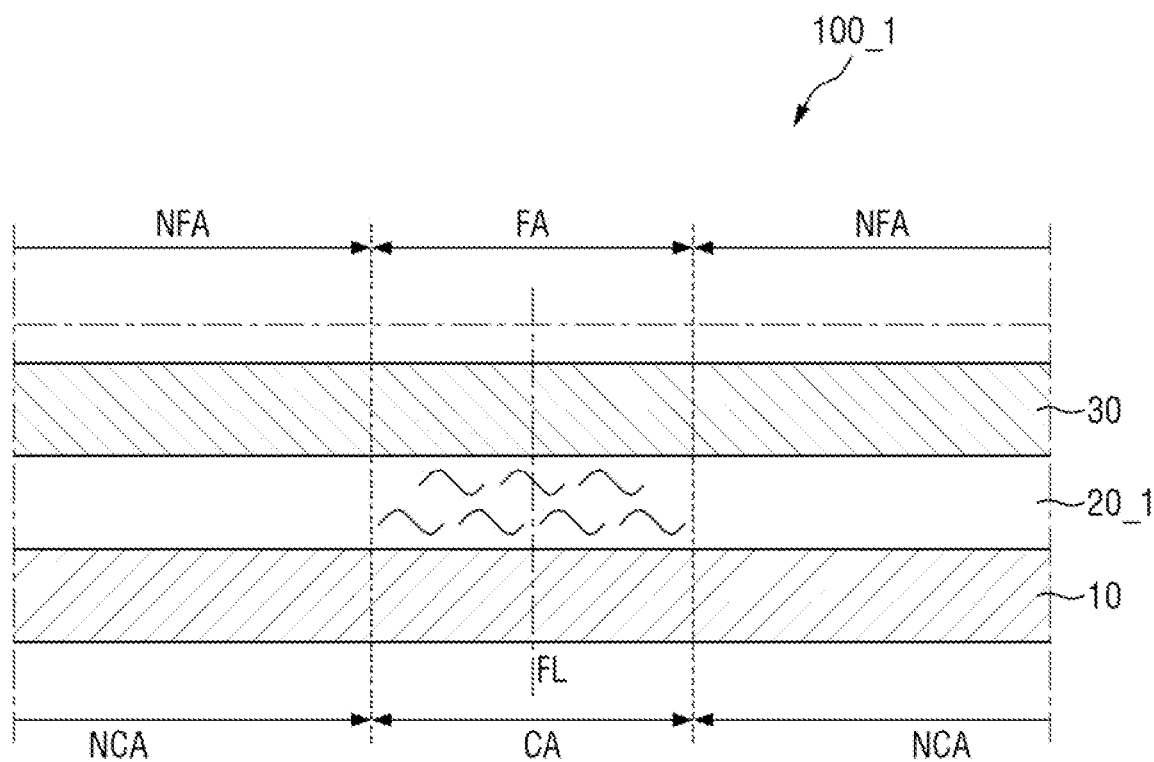

FIGS. 18 and 19 are cross-sectional views of a first optical clear bonding member of a display device according to an embodiment. The display device 100_1 shown in FIGS. 18 and 19 is substantially the same as the display device 100_1 shown in FIG. 16, except that the first optical clear bonding member 20_1 includes a crack portion CA and a non-crack portion NCA. Hereinafter, differences will be mainly described.

First, according to an embodiment, referring to FIG. 18, the first optical clear bonding member 20 includes a crack portion CA and a non-crack portion NCA, and at least a part of the crack portion CA overlaps the folding area FA. The folding area FA received a maximum transmitted stress when the display device 100_1 is folded. The crack portion CA of the first optical clear bonding member 20_1 overlaps the folding area FA, thereby effectively dispersing the stress. Here, the interface between the crack portion CA and the non-crack portion NCA is aligned with the interface between the folding area FA and the non-folding area NFA. That is, the crack portion CA is disposed in an area that overlaps the folding area FA of the first optical clear bonding member 201, and the non-crack portion NCA is an area that overlaps the non-folding area NFA. When the display device 100_1 is folded, the crack units C are densely disposed only in the area where the stress is transmitted, thereby effectively dispersing the transferred stress.

Further, according to an embodiment, referring to FIG. 19, the crack portion CA of the first optical clear bonding member 20_1 is disposed in an area that overlaps the folding area FA, and the crack portion CA extends into the non-folding area NFA. That is, the area that overlaps the folding area FA is included in the crack portion CA, and at least a part of the crack portion CA overlaps the non-folding area NFA. The area that overlaps the folding area FA is received the maximum stress transferred when folding the display device 100_1, but the stress is also transferred to the non-folding area NFA adjacent thereto. Therefore, the crack portion CA extends from the folding area FA to partially overlap the non-folding area NFA.

According to an embodiment, in a display device 100_2 according to an embodiment, no first optical clear bonding member 20_2 is disposed in an area that overlaps the folding area FA. An empty space is formed in an area of maximum deformation when folding the display device 100_2, for example, an area that overlaps the folding line FL, to reduce the total amount of the stress transferred to the first optical clear bonding member 20_2. Further, the stress transferred when folding the display device 100_2 is effectively dispersed by disposing the crack portion CA in the adjacent areas. Hereinafter, the display device 100_2 according to an embodiment will be described with reference to FIGS. 20 to 24.

Figure 20:
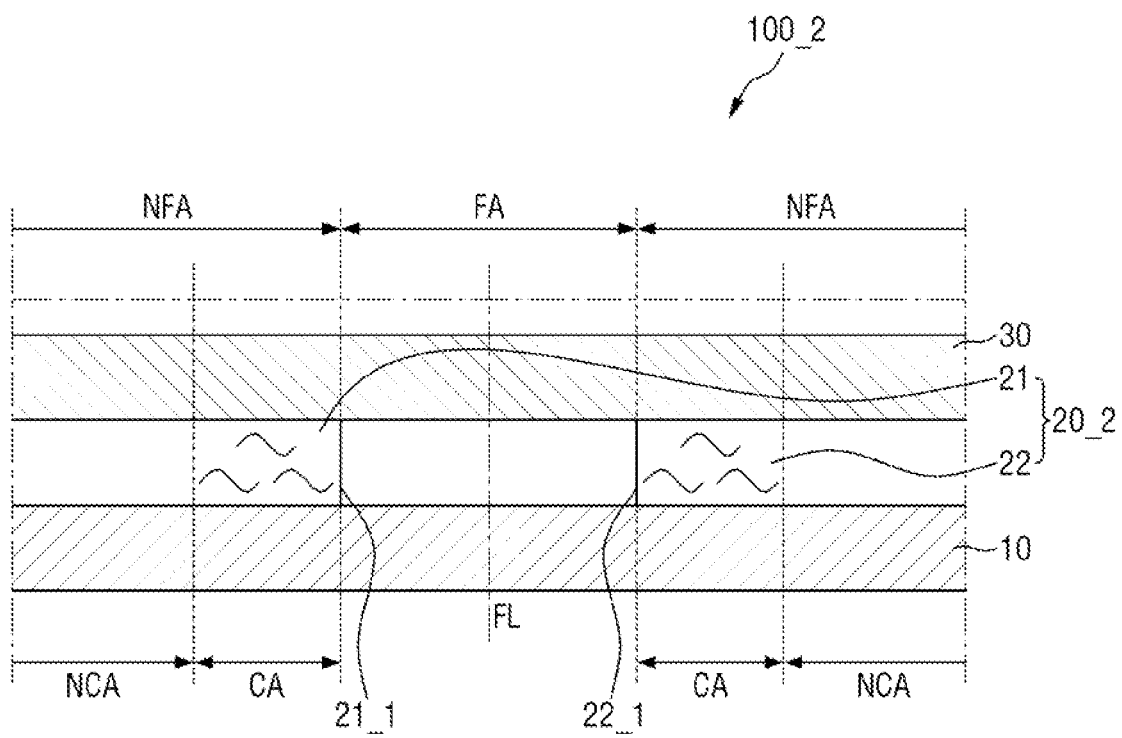
FIG. 20 is a cross-sectional view of an area in which is disposed a first optical clear bonding member of a display device according to another embodiment.

FIG. 20 is a cross-sectional view of an area in which a first optical clear bonding member of a display device according to an embodiment is disposed. As shown in FIG. 20, in the display device 100_2 according to an embodiment, the first optical clear bonding member 20_2 includes a first sub-bonding member 21 and a second sub-bonding member 22. The first sub-bonding member 21 and the second sub-bonding member 22 are spaced apart from each other in a direction perpendicular to the plane of the display member 10 and the touch member 30.

Further, according to an embodiment, the first sub-bonding member 21 and the second sub-bonding member 22 include a crack portion CA and a non-crack portion NCA, respectively. However, embodiments of the present disclosure are not limited thereto. For example, the first sub-bonding member 21 and the second sub-bonding member 22 can include a first crack portion HCA having a high density of crack units C and a second crack portion LCA having a low density of crack units C. Hereinafter is described a case where each of the first sub-bonding member 21 and the second sub-bonding member 22 include a crack portion CA and a non-crack portion NCA.

Referring to FIG. 20 again, according to an embodiment, the first sub-bonding member 21 and the second sub-bonding member 22 are spaced apart from each other in an area corresponding to a central portion of the display member 10 and the touch member 30. Although the position of the folding area FA or the non-folding area NFA on the display device 100_2 is not particularly limited, when the folding area FA is located in an area corresponding to a central portion of the display device 100_2, the first sub-bonding member 21 and the second sub-bonding member 22 can be spaced apart from each other in an area that overlaps the folding area FA, thereby forming an empty space. In particular, the first sub-bonding member 21 and the second sub-bonding member 22 face each other with respect to the folding line FL in the folding area FA.

Specifically, according to an embodiment, the first sub-bonding member 21 and the second sub-bonding member 22 are spaced apart from each other, and side portion a first side portion 21_1 and a second side portion 22_1 that face each other are aligned with the interface of the folding region FA and the non-folding region NFA. That is, the empty space formed by spacing the first sub-bonding member 21 and the second sub-bonding member 22 apart from each other overlaps only the folding area FA. Crack portions CA are formed in areas adjacent to the first side portion 21_1 and the second side portion 22_1.

As described above, according to an embodiment, since no first optical clear bonding member 20_2 is disposed in the folding area FA of the display device 100_2, the total amount of the transferred stress may be reduced. An empty space is formed in an area that overlaps the folding area FA, and crack portions CA are disposed in areas adjacent to the first side portion 21_1 and the second side portion 22_1 that face the empty space, so that stress is effectively dispersed.

According to an embodiment, when the display device 100_2 is folded, the deformation of the display panel 10 and the touch panel 30 is maximized in the folding area FA, particularly the folding line FL. As shown in FIG. 20, when an area in which no first optical clear bonding member 20_2 is disposed overlaps the folding area FA, there may be contact between the lamination members caused by folding.

According to an embodiment, when the lamination members are brought into direct contact with each other without being coupled through the first optical clear bonding member 20_2 damage or malfunctions due to contact can occur. Therefore, when forming an empty space in an area that overlaps the folding area FA, in particular, in an area that overlaps the folding line FL, the display device 100_2 has a structure that prevents contact between the lamination members. Details thereof will be described with reference to FIGS. 21 to 24.

FIGS. 21 to 24 are sectional views of structures where a first optical clear bonding member of a display device according to an embodiment is disposed.

Figure 21:
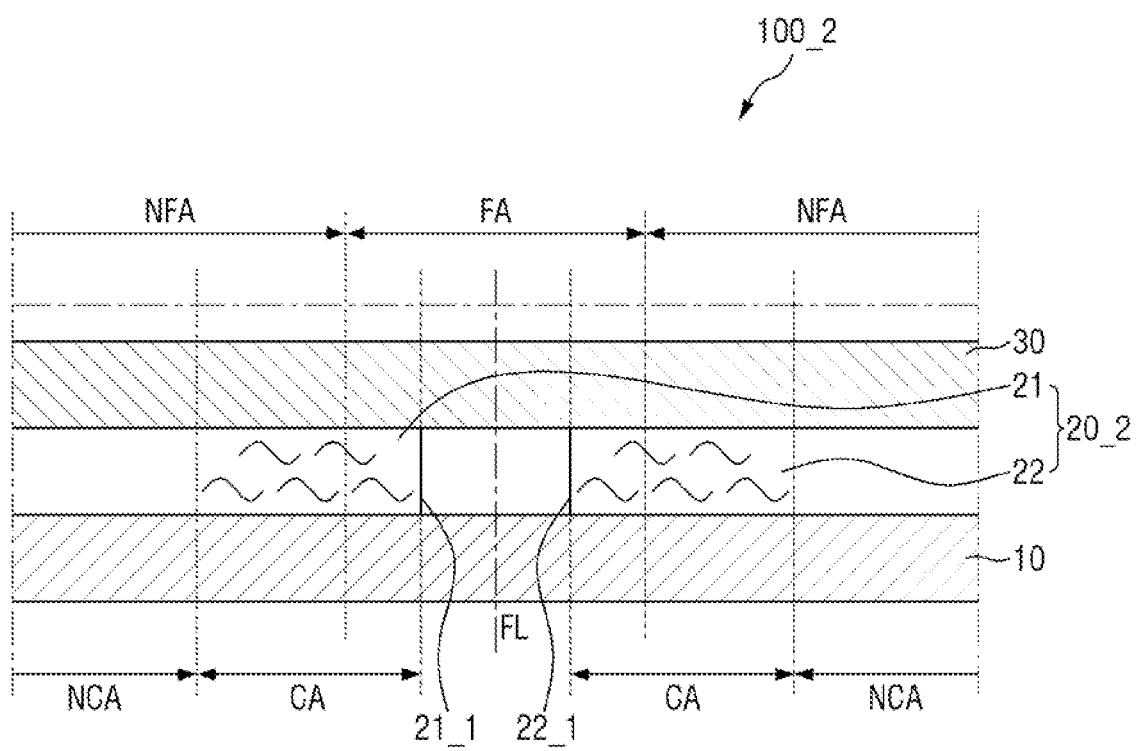
FIGS. 21 to 24 are sectional views of structures where a first optical clear bonding member of a display device according to an embodiment is disposed.

Specifically, according to an embodiment, referring to FIG. 21, the first side portion 21_1 of the first sub-bonding member 21 and the second side portion 22_1 of the second sub-bonding member 22 face the folding area FA from the interface of the folding area FA and the non-folding area NFA. Unlike the display device 100_2 of FIG. 20, the first sub-bonding member 21 and the second sub-bonding member 22 partially overlaps the folding area FA, and the crack portion CA is disposed in the overlapping area. When the first sub-bonding member 21 and the second sub-bonding member 22 partially overlap the folding area FA, even if the display device 100_2 is maximally bent at the folding line FL, the partially overlapping area occupies a volume which prevents direct contact of the lamination members.

According to an embodiment, the first side portion 211 of the first sub-bonding member 21 and the second side portion 22_1 of the second sub-bonding member 22 are not flat. That is, at least a part of the first side portion 21_1 and the second side portion 22_1 includes protrusions that protrude toward each other.

Figure 22:
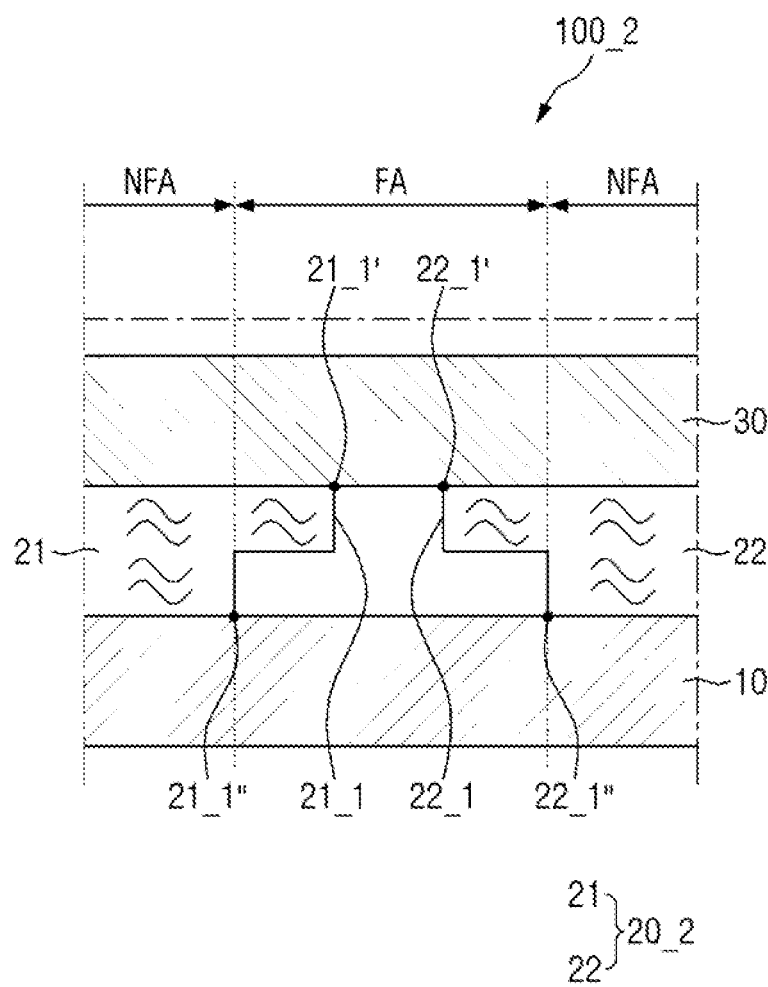

As shown in FIG. 22, according to an embodiment, the first side portion 21_1 and the second side portion 22_1 have first end portions 21_1' and 22_1', respectively, that contact the touch member 30 positioned further into the folding are FA as compared with the respective second end portions 21_1" and 22_1" that contact the display member 10.

However, embodiments of the present disclosure are not limited thereto. There may be a case where the second end portions 21_1" and 22_1" are positioned further into the folding are FA as compared with the first end portions 21_1' and 22_1'.

FIG. 22 illustrates that, according to an embodiment, for the first side portion 21_1 and the second side portion 22_1, the first end portions 21_1' and 22_1', that contact the touch member 30 protrude from the second end portions 21_1" and 22_1" in contact the display member 10.

Specifically, according to an embodiment, the first end portions 21_1' and 22_1' are positioned further into the folding are FA as compared with the second end portions 211" and 22_1", so that the empty space formed by the spaced apart first and sub-adhesive members 21 and 22 has a concave-convex structure. In particular, the surfaces that are orthogonal to the touch member 30 at the first end portions 21_1' and 22_1' and the surfaces that are orthogonal to the display member 10 at the second end portions 211" and 22_1" are parallel to each other, so that the empty space has a stepped structure.

Figure 23:
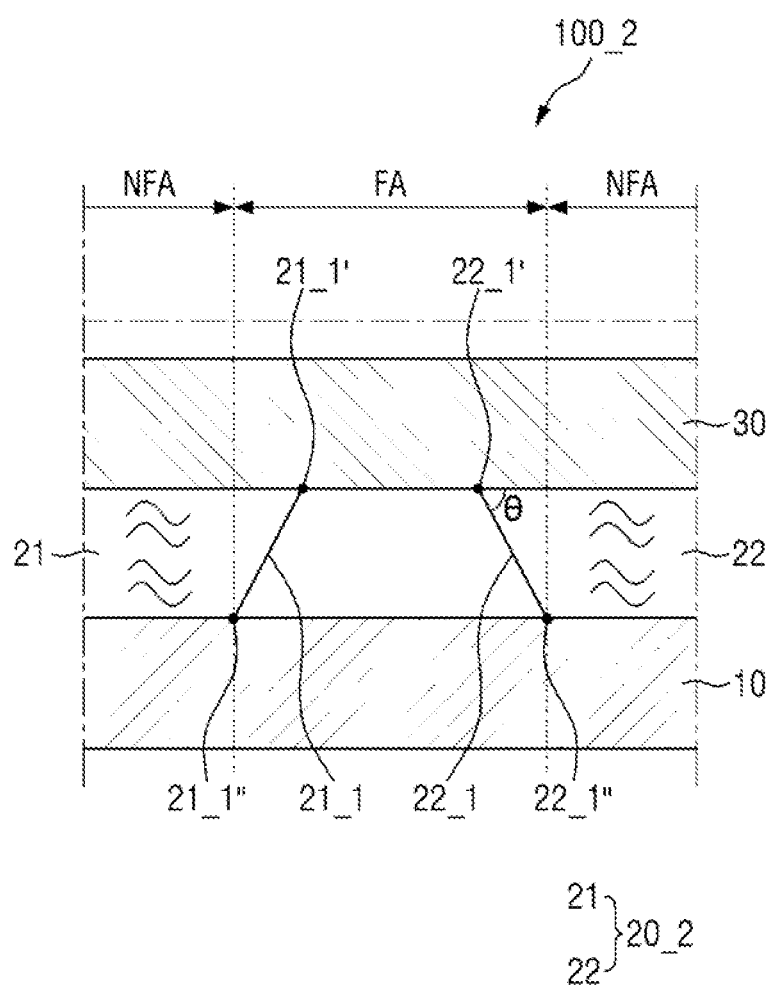

In an embodiment, the first end portions 21_1' and 22_1' positioned into the folding area FA are linearly connected to the second end portions 21_1' and 22_1". Referring to FIG. 23, the first side portion 21_1 and the second side portion 22_1 are inclined opposite to each other. Here, the inclination angle formed by the first side portion 21_1 and the second side portion 22_1 with the touch member 30 ranges from about 450 to about 80°. The inclination angle formed by the first side portion 21_1 may differ from the inclination angle formed by the second side portion 22_1. However, embodiments of the present disclosure are not limited thereto, and the inclination angle can be adjusted depending on the degree of folding of the display device 100_2.

According to an embodiment, each of the display devices 100_2 of FIGS. 22 and 23 has a structure in which the upper surface of the empty space formed by the spaced apart first and second sub-bonding members 21 and 22 is shorter than the lower surface thereof. That is, the distance between the first end portions 21_1' and 22_1' less than the distance between the second end portions 21_1' and 22_1".

According to an embodiment, when the display device 100_2 is bent by applying an external force from the upper portion of the display device 100_2 to the lower portion of the display device 100_2, the touch member 30 is more deformed than the display member 10. That is, the stress transferred to the touch member 30 is larger than the stress transferred to the display member 10, and a larger number of crack units C are disposed at the first end portions 211' and 22_1' of the first and second sub-bonding members 21 and 22 to disperse the transferred stress. In contrast, when the display device 100_2 is bent by applying an external force from the lower portion of the display device 100_2 to the upper portion of the display device 100_2, a larger number of crack units C are disposed at the second end portions 211" and 22_1" of the first and second sub-bonding members 21 and 22.

That is, according to an embodiment, the transferred stress can be effectively dispersed by adjusting the positions of the first end portions 21_1' and 22_1' or the second end portions 21_1" and 22_1" along the direction in which the display device 100_2 is folded. Further, since the first and second side portions 21_1 and 22_1 include surfaces protruding toward each other, it is also possible to prevent lamination members from coming into direct contact with each other.

Figure 24:
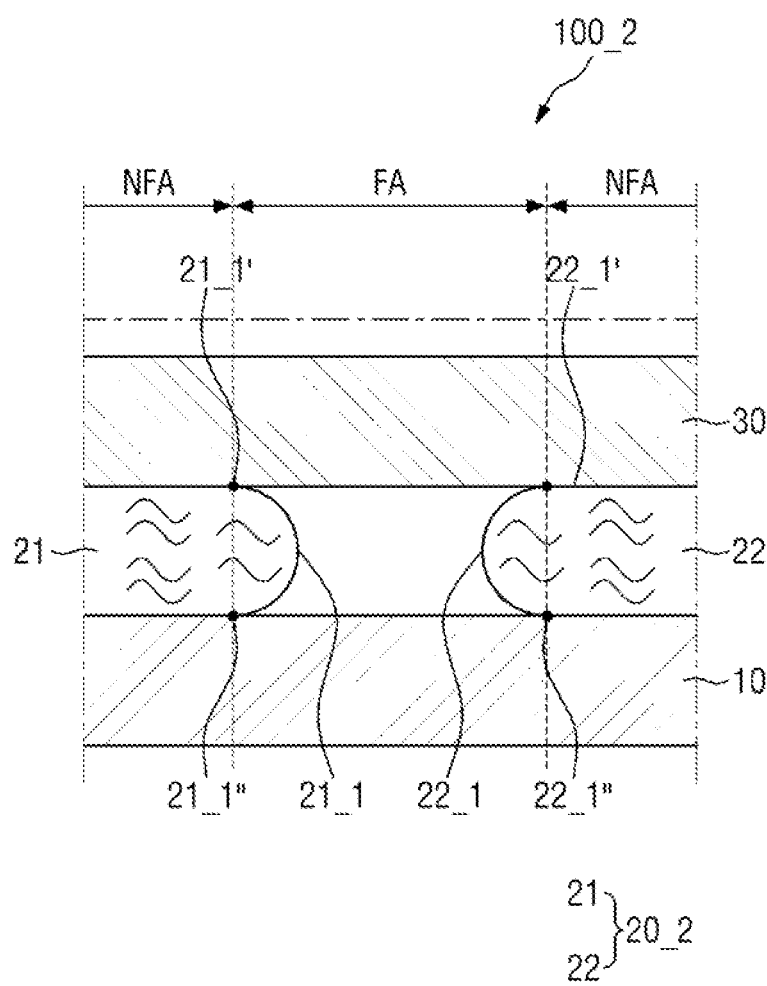

According to an embodiment, as shown in FIG. 24, a part of the first side portion 21_1 and a part of the second side portion 22_1 convexly protrude toward each other. In this case, although the first side portion 21_1 and the second side portion 22_1 are not parallel structures, the distance between first end portions 21_1' and 22_1' is equal to the distance between the second end portions 21_1" and 22_1".

Specifically, according to an embodiment, when a part of the first side portion 21_1 and a part of the second side portion 22_1 convexly protrude, the volume between the first and second side portions 21_1 and 22_1 that partially overlaps the folding area FA of the display device 100_2 prevents the lamination members from coming into direct contact to with each other. Further, the distances between the first end portions 21_1' and 22_1' and between the second end portions 21_1" and 22_1" are greater than the distance between the protrusions, and the first end portions 21_1' and 22_1' and the second end portions 21_1" and 22_1" are positioned rearward from the protrusions of the first and second side portions 21_1 and 22_1. Thus, in an area that overlaps the folding area FA of the display device 100_2, no first optical clear bonding member 20_2 is disposed between the display member 10 and the touch member 30, so that the transferred stress is reduced. Further, contact between the lamination members when folding the display device 100_2 can be effectively prevented by the convex protrusions.

According to an embodiment, contact between the lamination members can be prevented by including a protective layer in addition to the lamination members, such as the display member 10, the touch member 30, and the window member 50. The protective layer reinforces the strength of a flexible substrate or alleviates stress in the bending area.

Figure 25:
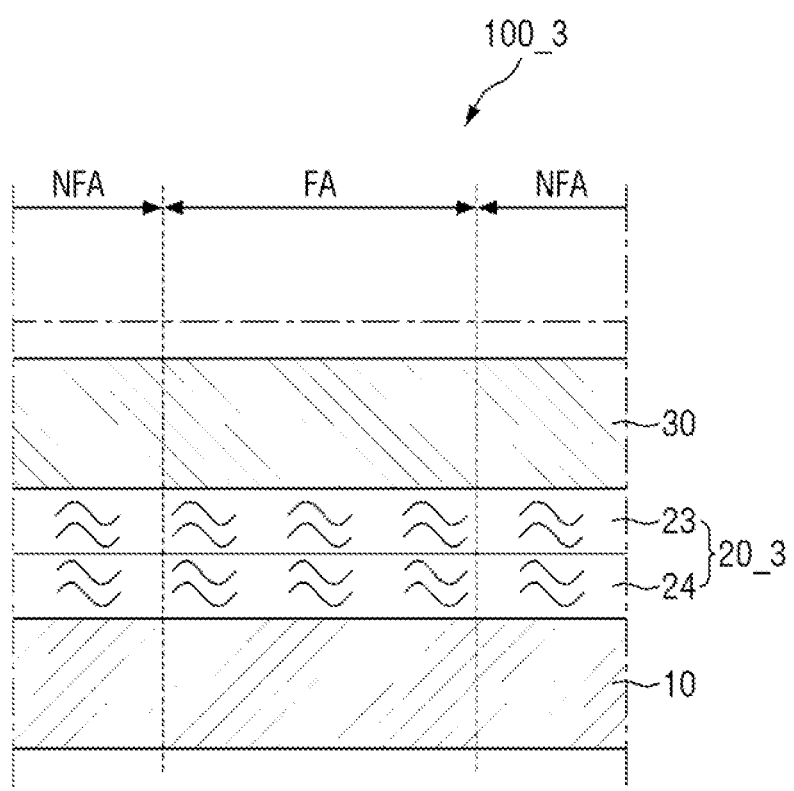
FIG. 25 is a cross-sectional view of an area in which is disposed a first optical clear bonding member of a display device according to another embodiment.

According to an embodiment, in a display device 100_3 according to an embodiment, a first optical clear bonding member 20_3 has a laminate structure. FIG. 25 is a cross-sectional view of an area in which a first optical clear bonding member of a display device according to an embodiment is disposed.

Specifically, according to an embodiment, the first optical clear bonding member 20_3 includes a third sub-bonding member 23 and a fourth sub-bonding member 24. The third sub-bonding member 23 and the fourth sub-bonding member 24 are laminated in a direction in which the display member 10 and the touch member 30 are laminated. Each of the third sub-bonding member 23 and the fourth sub-bonding member 24 includes a crack portion CA formed in at least a part thereof. The crack portion CA is disposed in an area that overlaps the folding area FA of the display device 1003 or an area adjacent thereto. Since the crack portion CA has been described as above, a description thereof will be omitted.

According to an embodiment, FIG. 25 illustrates a case where the fourth sub-bonding member 24 is attached to the display member, and the third sub-bonding member 23 is laminated to the fourth sub-bonding member 24 and attached to the touch member 30. However, embodiments of the present disclosure are not limited thereto. The first optical clear bonding member 20_3 may be formed by laminating two or more layers. The first optical clear bonding member 20_3 can be provided with a desired thickness by adjusting the number of layers to be laminated.

Further, according to an embodiment, as described above, the third sub-bonding member 23 and the fourth sub-bonding member 24 can be spaced apart from each other by an empty space in an area that overlaps the folding area FA of the display device 100_3. Hereinafter, a display device 100_3 that includes the first optical clear bonding member 20_3 having two laminated layers spaced apart from each other will be described with reference to FIGS. 26 to 28.

Figure 26:
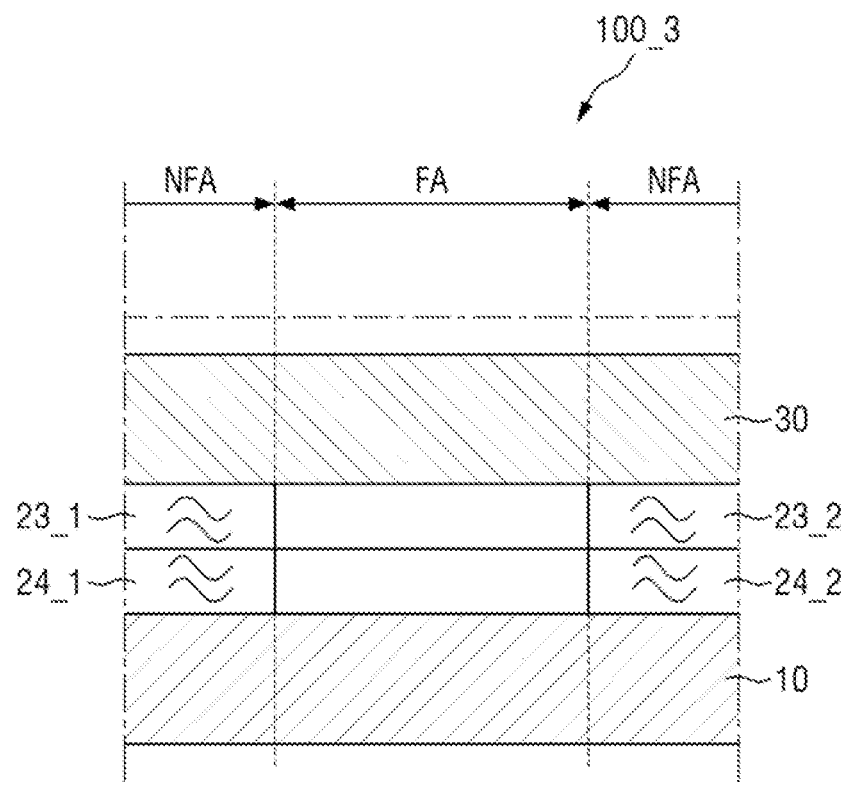
FIGS. 26 to 28 are cross-sectional views of structures where a first optical clear bonding member of a display device according to an embodiment is disposed.
Figure 26:
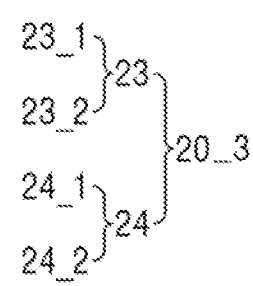
Figure 27:
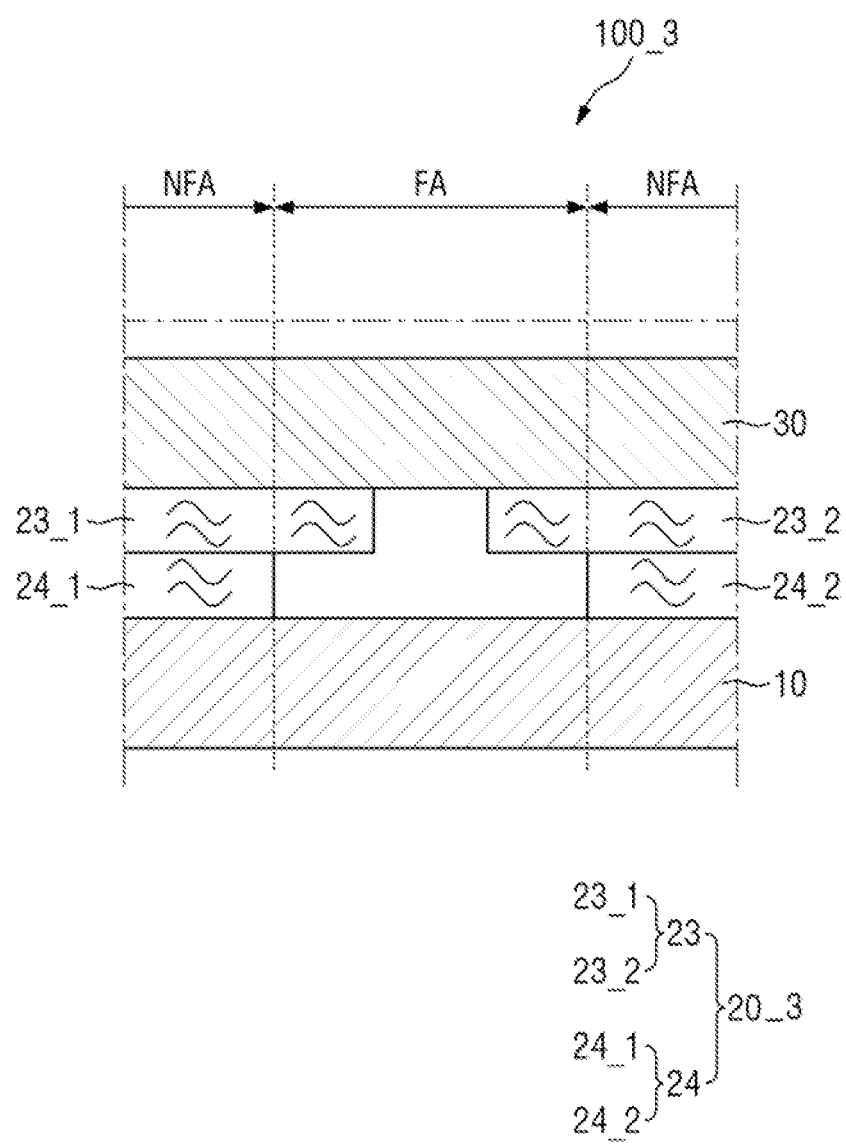
Figure 28:
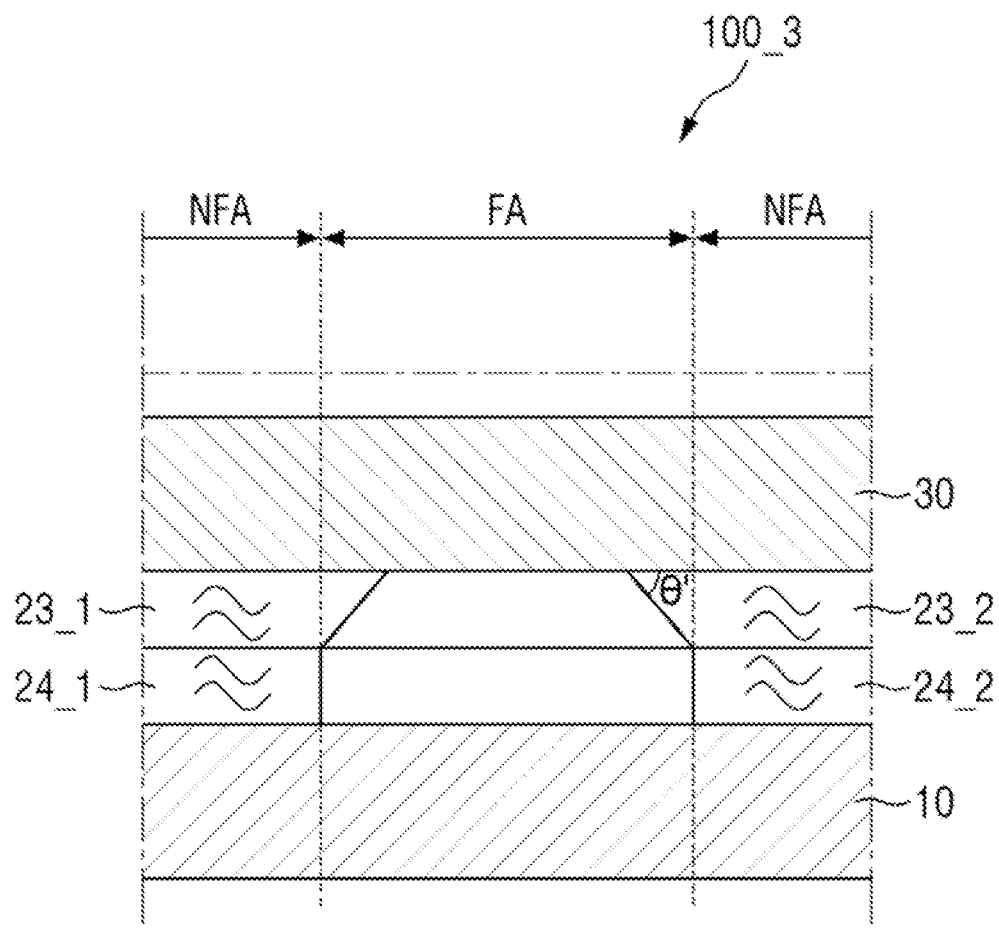

FIGS. 26 to 28 are cross-sectional views of structures where a first optical clear bonding member of a display device according to still another embodiment is disposed.

In the display device 100_3 according to an embodiment, the first optical clear bonding member 20_3 has a structure in which the third sub-bonding member 23 and the fourth sub-bonding member 24 are laminated, and at least one of the third sub-bonding member 23 and the fourth sub-bonding member 24 forms an empty space by not being disposed in at least a part of an area that overlaps the folding area FA of the display device 100_3.

According to an embodiment, the third sub-bonding member 23 includes a sub-bonding member 23_1 and a sub-bonding member 232, and the fourth sub-bonding member 24 may include a sub-bonding member 24_1 and a sub-bonding member 24_2. The sub-bonding member 23_1 and the sub-bonding member 23_2 are spaced apart from each other by an empty space in an area that overlaps the folding area FA. Similarly, the sub-bonding member 24_1 and the sub-bonding member 24_2 are spaced apart from each other by an empty space in the area that overlaps the folding area FA.

Referring to FIG. 26, according to an embodiment, the empty spaces formed between sub-bonding member 23_1 and the sub-bonding member 23_2 and between the sub-bonding member 24_1 and the sub-bonding member 24_2 are aligned with each other at the interface between the folding area FA and the non-folding area NFA of the display device 100_3. This configuration is the same as that described with reference to FIG. 20.

Referring to FIG. 27, according to an embodiment, the side portions of the sub-bonding member 23_1 and the sub-bonding member 23_2 extend into an area that overlaps the folding area FA as compared with the side portions of the sub-bonding member 24_1 and the sub-bonding member 24_2. However, embodiments of the present disclosure are not limited thereto, and the side portions of the sub-bonding member 24_1 and the sub-bonding member 24_2 may extend into the area that overlaps the folding area FA as compared with the side portions of the sub-bonding member 23_1 and the sub-bonding member 232. This configuration is the same as that described with reference to FIG. 22. When the display device 100_3 is folded, the touch member 30 is more deformed than the display member 10, and received more transmitted stress. Thus, the side portions of the sub-bonding member 23_1 and the sub-bonding member 23_2 extend into the area that overlaps the folding area FA, so that a larger number of crack units C can be disposed. Accordingly, it is possible to prevent the display member 10 and the touch member 30 from coming into direct contact with each other while effectively dispersing the stress transferred by folding the display device 100_3.

Further, according to an embodiment, as shown in FIG. 28, the side portions of the sub-bonding member 23_1 and the sub-bonding member 23_2 are inclined at a predetermined angle θ' without being parallel to each other. Referring to FIG. 28, the sub-bonding member 23_1 and the sub-bonding member 23_2 extend into an area that overlaps the folding area FA while forming an inclination angle θ' with respect to the touch member 30. This configuration is substantially similar that described with reference to FIG. 23.

In concluding the detailed description, those skilled in the art will appreciate that many variations and modifications can be made to exemplary embodiments without substantially departing from the principles of embodiments of the present disclosure. Therefore, the disclosed exemplary embodiments of the disclosure are used in a generic and descriptive sense only and not for purposes of limitation.

What is claimed is:

1. A method of manufacturing a display device, comprising:
    preparing an optical clear bonding portion that has voids formed therein;
    disposing the optical clear bonding portion between a first member and a second member wherein a laminate is formed; and
    pressing the laminate,
    wherein preparing the optical clear bonding portion includes:
        dispersing acid-soluble particles in an adhesive resin to form a resin mixture;
        dissolving the acid-soluble particles by an acid-treatment wherein voids are formed in the resin mixture; and
        heat-treating the resin mixture having the voids.

2. The method of claim 1,
    wherein pressing the laminate decreases a thickness of the optical clear bonding portion, wherein the decrease in the thickness of the optical clear bonding portion is inversely proportional to a fraction of the voids formed in the optical clear bonding portion.

* * * * *